US009256667B2

(12) United States Patent
Koudas et al.

(10) Patent No.: US 9,256,667 B2
(45) Date of Patent: Feb. 9, 2016

(54) METHOD AND SYSTEM FOR INFORMATION DISCOVERY AND TEXT ANALYSIS

(75) Inventors: Nick Koudas, Toronto (CA); Nilesh Bansal, Toronto (CA)

(73) Assignee: Sysomos Inc., Toronto (CA)

(*) Notice: Subject to any disclaimer, the term of this patent is extended or adjusted under 35 U.S.C. 154(b) by 421 days.

(21) Appl. No.: 12/501,324

(22) Filed: Jul. 10, 2009

(65) Prior Publication Data

US 2009/0319518 A1 Dec. 24, 2009

Related U.S. Application Data

(63) Continuation of application No. PCT/CA2008/000125, filed on Jan. 10, 2008.

(60) Provisional application No. 60/884,354, filed on Jan. 10, 2007.

(51) Int. Cl.
*G06F 17/30* (2006.01)

(52) U.S. Cl.
CPC .... *G06F 17/30696* (2013.01); *G06F 17/30864* (2013.01)

(58) Field of Classification Search
CPC .............. G06F 17/30011; G06F 17/30864; G06F 17/30619; G06F 17/30613; G06F 17/30616; G06F 17/30044; G06F 17/30861; G06F 17/3087
USPC ............... 707/602, 730, 737; 3/602, 730, 737
See application file for complete search history.

(56) References Cited

U.S. PATENT DOCUMENTS

| 5,146,405 | A | 9/1992 | Church |
| 5,819,260 | A | 10/1998 | Lu et al. |
| 6,081,774 | A | 6/2000 | de Hita et al. |
| 6,360,215 | B1 | 3/2002 | Judd et al. |
| 6,772,150 | B1 | 8/2004 | Whitman et al. |
| 6,775,666 | B1 | 8/2004 | Stumpf et al. |
| 7,143,118 | B2 | 11/2006 | Eichstaedt et al. |

(Continued)

FOREIGN PATENT DOCUMENTS

WO    WO 2004/114163 A2    12/2004

OTHER PUBLICATIONS

Glance, Natalie, Matthew Hurst, and Takashi Tomokiyo. "Blogpulse: Automated trend discovery for weblogs." WWW 2004 workshop on the weblogging ecosystem: Aggregation, analysis and dynamics. vol. 2004. 2004.*

(Continued)

*Primary Examiner* — Nan Hutton
(74) *Attorney, Agent, or Firm* — Wilfred P. So; Thomas Wong; Blake, Cassels & Graydon LLP

(57) ABSTRACT

A method for searching text sources including temporally-ordered data objects, such as a blog, is provided including the steps of: (i) providing access to text sources, each text source including temporally-ordered data objects; (ii) obtaining or generating a search query based on terms and time intervals; (iii) obtaining or generating time data associated with the data objects; (iv) identifying data objects based on the search query; and (v) generating popularity curves based on the frequency of data objects corresponding to one or more of the search terms in the one or more time intervals. A system and computer program for text source searching is also provided.

22 Claims, 12 Drawing Sheets

(56) References Cited

U.S. PATENT DOCUMENTS

| | | | |
|---|---|---|---|
| 7,188,078 B2 | 3/2007 | Arnett et al. | |
| 7,231,405 B2 | 6/2007 | Xia | |
| 7,287,025 B2 | 10/2007 | Wen et al. | |
| 7,315,861 B2 | 1/2008 | Seibel et al. | |
| 7,685,091 B2* | 3/2010 | Boone et al. | 707/737 |
| 2006/0031195 A1 | 2/2006 | Patterson | |
| 2006/0069663 A1* | 3/2006 | Adar et al. | 707/1 |
| 2006/0106560 A1* | 5/2006 | Folting et al. | 702/102 |
| 2006/0200342 A1 | 9/2006 | Corston-Oliver et al. | |
| 2006/0284873 A1* | 12/2006 | Forrest et al. | 345/440 |
| 2008/0077582 A1* | 3/2008 | Reed | 707/5 |
| 2008/0228695 A1* | 9/2008 | Sifry et al. | 707/2 |

OTHER PUBLICATIONS

Amitay, Einat, et al. "Trend detection through temporal link analysis." Journal of the American Society for Information Science and Technology 55.14 (2004): 1270-1281.*

Kleinberg, Jon. "Temporal dynamics of on-line information streams." Data stream management: Processing high-speed data streams (2006).*

Glance, Natalie S. et al.; "BlogPulse: Automated Trend Discovery for Weblogs"; Proceedings of the WWW 204 Workshop on the Weblogging Ecosystem: Aggregation, Analysis and Dynamics; 2004.

Lin, J. et al.; "Mapping the Blogosphere in America"; Blogging Ecosystem Thirteenth International World Wide Web Conference; 2004; New York.

Che, A.; International Search Report from corresponding PCT Application No. PCT/CA2008/000125; search completed Apr. 25, 2008.

Dumitrescu, C.; Supplementary Search Report from corresponding European Application No. 08706272.5; search completed Oct. 20, 2011.

* cited by examiner

FIG. 3A  FIG. 3B anti apologies apologize apology arab arabe arabic ate august bloody bomb bombe bombing bombs children civilian civilians conflict conflicting den drove drunk east fire fired fires firing fri fried fries fry frying heat heated heating hezbollah hide hiding innocence innocent innocently israel israeli jew jewish jews kill killing kills lake lebanese lebanon lol math maths monday mondays remark remarkable remarkably rice ricing rocket rocketing saturday september slept southern sunday village war wars woke

FIG. 4

|  | Wii | Sony | Nintendo | Play Station | Tomb Raider |
|---|---|---|---|---|---|
| Wii | 0 | 2/10 | 7/10 | 1/10 | 0 |
| Sony | 0 | 0 | 0 | 4/4 | 0 |
| Nintendo | 5/6 | 1/6 | 0 | 0 | 0 |
| Play Station | 2/11 | 6/11 | 1/11 | 0 | 2/11 |
| Tomb Raider | 0 | 0 | 0 | 1/1 | 0 |

| iterations | Wii | Sony | Nintendo | Play Station |
|---|---|---|---|---|
| 0 | 0 | 0 | 1 | 0 |
| 1 | 0.67 | 0.13 | 0.20 | 0 |
| 2 | 0.13 | 0.06 | 0.74 | 0.06 |
| 3 | 0.49 | 0.11 | 0.38 | 0.02 |
| 4 | 0.25 | 0.08 | 0.62 | 0.05 |
| 5 | 0.41 | 0.10 | 0.46 | 0.03 |
| .. | .. | .. | .. | .. |
| infinite | 0.35 | 0.09 | 0.52 | 0.03 |

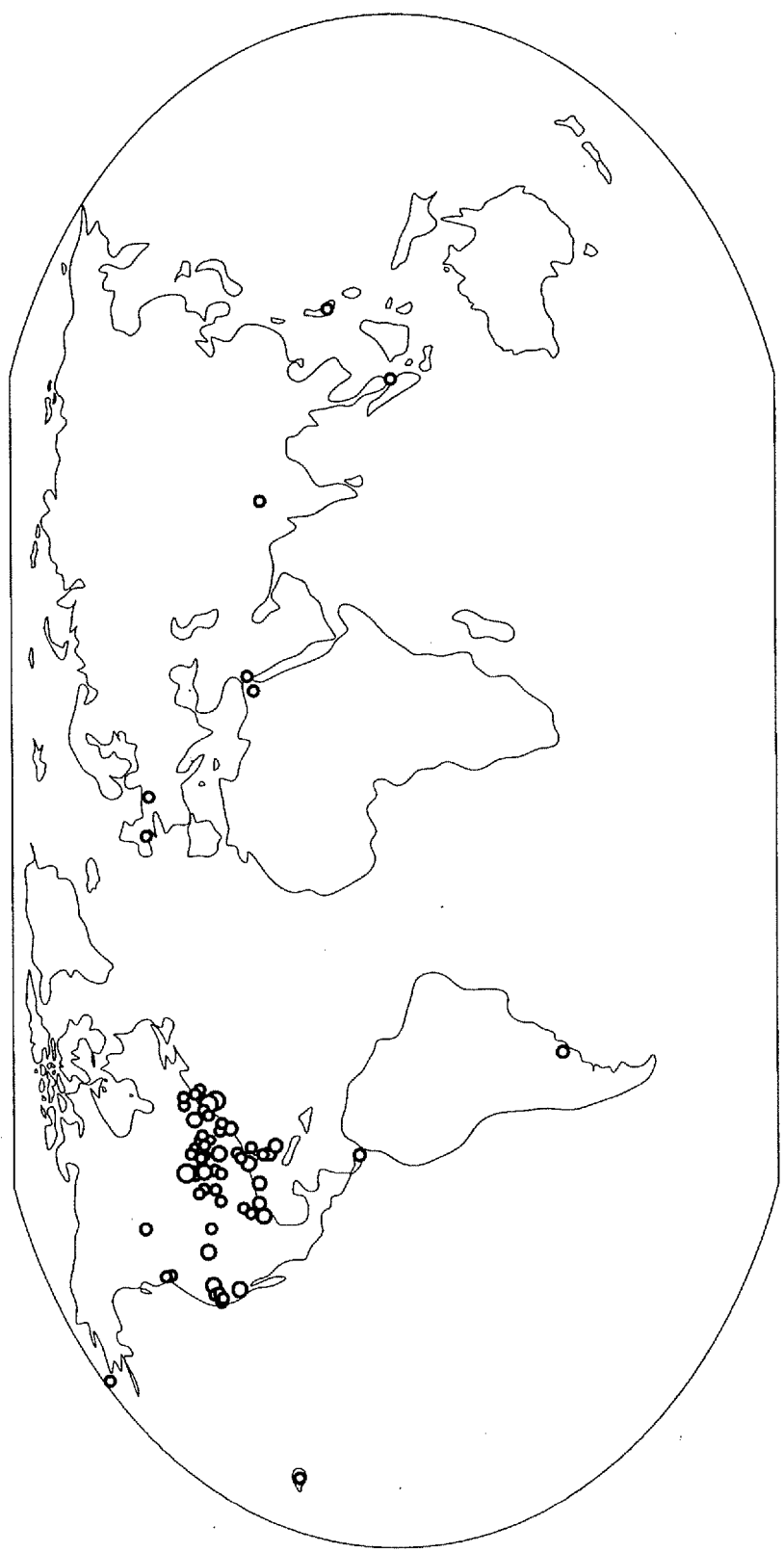

O'Neal Dozier Strikes Again
13 - Dec - 2007 in pushingrope.blogspot.com  ☆☆☆☆☆☆☆☆
said he won't support Barack Obama : "I don't see the patriotism. "That is hardly...complaint that
Obama doesn't wear American flag lapels. If anyone wants...

We have a new winner
13 - Dec - 2007 in 28bytes
. It's no wonder Barack Obam
Thompson 14. Barack Obam to <u>what's being said</u>. And did Tom Tancredo really go on record opposing Man Daisies?

(no title)
13 - Dec - 2007 in grandthe
Hilary Clinton's campaign w
some candidates, he had no Congressman tancredo? What would you do about mandates?

No, I don't believe in man daisies--

(no title)
13 - Dec - 2007 in latestne
Sen. Hillary Rodham Clinton
presidential candidates in Ne
potential firewall should she Anyway, that's my list. How does it match up with yours?

Summary: I didn't think a presidential candidate could possibly irritate me more than Hilary Clinton, but that was before Alan Keyes showed up. It's no wonder Barack Obama cleaned his clock back in '04; I'm surprised he even got the 27% of the vote he did. The organizers, the bafflingly incompetent Des Moines Register, couldn't even be troubled to put the names of the speakers next to what's being said.

BARACK OBAMA...IS H
13 - Dec - 2007 in joehawk
😊 I think so....Vote for Barac

Posted in <u>28bytes.livejournal.com</u>
The script is mostly basic latin
Language identified as English
Total Sentimental orientation: NEG show details
<u>Flesch-Kincaid Grade level</u>: 5.6 summarize

The GOP's Iran option
13 - Dec - 2007 in snuffysn
in recent weeks. On the Dem
substantially receded. Obam
Bush...to give Bush authorization for military action against Iraq, and as Obama's poll numbers...

US Jews Tilt Rightwards on Israel by Jim Lobe

| keyword posting lists | | | | time index |
|---|---|---|---|---|
| global | | warming | | |
| 109 | m | 101 | f | Apr 1 [1, 56] |
| 213 | m | 109 | m | Apr 2 [57, 106] |
| 256 | f | 220 | f | Apr 3 [107, 130] |
| 314 | m | 299 | f | Apr 4 [131, 194] |
| 378 | f | 314 | m | Apr 5 [159, 258] |
| 405 | f | | | Apr 6 [259, 304] |
| | | | | Apr 7 [305, 340] |
| | | | | Apr 8 [341, 399] |
| | | | | Apr 9 [400, 456] |

*FIG. 16*

METHOD AND SYSTEM FOR INFORMATION DISCOVERY AND TEXT ANALYSIS

CROSS REFERENCE TO RELATED APPLICATIONS

This application is a continuation of PCT Application No. PCT/CA2008/000125 filed on Jan. 10, 2008, which claims priority from U.S. Provisional Patent Application No. 60/884,354 filed on Jan. 10, 2007, the contents of each above-referenced application being incorporated herein by reference.

FIELD OF THE INVENTION

The present invention relates to methods and systems for information discovery and text analysis. The present invention particularly relates to methods and systems for searching online temporally ordered text data sources, such as a blog or any other form of social media including online social networks, emails, and newsgroups.

BACKGROUND OF THE INVENTION

The popularity of blogs has increased at a significant rate over the last few years. It is estimated that the size of the "Blogosphere" in August 2006 was one hundred times larger than three years previous. According to the same estimates, blogging activity is doubling in size every two hundred days or about once every six and a half months. The weblog tracking company TECHNORATI™ reports that as of August 2006 it has been tracking over 50 million blogs. Without a doubt, blogging is a social phenomenon, which is gaining popularity across several age groups, with the bulk of blogging activity generated by people in the age group of 13-29.

At the same time the popularity of social networking sites has also been increasing steadily. It is estimated that currently social networking site MySpace has 130 million registered users and that FACEBOOK™ has approximately 70 million. Reports project that 250 million people will be on social networks by 2009.

The activity in the sphere of blogs has led to the coining of new words. The term Blogger refers to an individual contributing content in digital form to web logs, social networking sites or any online forum. The term Blogosphere references the collection of web logs, social networking sites and any forum and medium of online content contributed to by individuals.

Bloggers produce diverse types of information. General topics include personal diaries, experiences (such as those collected through traveling or concerts), opinions (for example, those invoked by products, events, people, music groups, businesses, etc.), information technology, and politics, to name but a few of the vast topics canvassed by blogs. This information is highly significant as the Blogosphere is an unregulated collective and it evolves by the contributions of individuals. Collecting, monitoring and analyzing information on blogs can provide key insights into public opinion on a variety of topics, for example products, political views, entertainment, etc. Analysis of blogs can also identify events of interest, based on their popularity in the Blogosphere. Moreover, it can be a source of competitive intelligence information. Analysis can also provide insights on the usefulness and effect of marketing campaigns in the case of products, public relations strategies, public figures, etc. As such blog analysis offers opportunities for tracking the dynamics of public opinion. As a result, techniques that aid the collection, analysis, mining and efficient querying of blogs are significant. This is especially true due to the growing popularity of blogs and the fact that this trend is expected to persist.

Traditional web search technology can be readily applied on the Blogosphere. Indeed, numerous search sites exist, specializing in the Blogosphere. The flaw of the application of traditional web search technologies to the Blogosphere is that they fail to take into consideration the differences between crawling the World Wide Web and the Blogosphere. Information in blogs has a well defined temporal dimension that is not present in more traditional web content (i.e. html pages). Blog posts have a time-stamp and may trigger additional posts by the same or other bloggers. The temporal dimension in particular, imposes an ordering facility on the Blogosphere that it can be utilized for effective querying of blogs.

For example, consider a search for information related to the actor "Phillip Seymour Hoffman" on the Blogosphere. The functionality that a traditional search engine offers is a list of all blogs posts containing the search string, ranked in some order, as described in U.S. Pat. No. 6,772,150 and U.S. Pat. No. 7,315,861. Although this is informative, in terms of information discovery greater functionality can be achieved in the case of blogs (or any other temporally ordered streaming text sources, for that matter).

The result of the growing popularity of blogs and the proliferation in the number of people maintaining blogs is an increased interest in search and analysis engines for the Blogosphere. These engines use a variety of techniques for information discovery and text analysis. For example, a popularity curve is a graphical visualization of the popularity of a searched query within a temporal window. Popularity curves can be used for analysis, as fluctuations in popularity can provide insight into topics related to a query.

Specifically, TECHNORATI™, BLOGPULSE™ and ICEROCKET™ are online search resources that have the ability to display popularity curves for user queries. Popularity curves can be used to provide a drill down or roll-up style interface thereby allowing the user to easily restrict the search to a specific time interval. The system and method of curves applied by BLOGPULSE™ provides such an interface, while those of TECHNORATI™ and ICEROCKET™ do not.

However, none of the existing blog analysis tools provide any feedback about time-specific events of interest on their popularity curves. Moreover, other inventions that do recognize time-specific events of interest do not do so in a manner that is linked to a popularity curve, as exemplified by U.S. Pat. No. 7,188,078. This makes the task of information discovery tedious. A system that can identify time-specific events of interest would therefore be of assistance to a user.

The system and method of GOOGLE TRENDS™ provides information about the popularity of different keywords in GOOGLE™ search volume. However, since these popularity curves are based on search volume, and not on text content, the functionality to expand or collapse a temporal window is not available. GOOGLE TRENDS™ can also label parts of the popularity curve based on spikes in volume of news stories for a particular keyword. However, these labels, while informative, are difficult to use due to the lack of a navigational interface to facilitate selection of time intervals for analysis. Moreover, these labels are not based on data displayed on the popularity curve, but on a separate data source.

As well, known blog analysis systems and methods are limited with respect to the use of correlated keywords. Many search sites, including GOOGLE™ and TECHNORATI™, use their search volume to identify related queries. However, search volume is available solely for popular search sites and is inaccessible for most others. Other inventions establish correlations between keywords through reliance upon past queries, as is the method of U.S. Pat. No. 7,287,025, instead of focusing upon the content of a present query. These methods distort the range of related query suggestions.

The system and methods of TECHNORATI™, ICEROCKET™ and U.S. Pat. No. 6,360,215 utilize a list of related "tags" with the searched query for navigation. However, the drawback to this approach is that because tagging requires manual effort by bloggers, most of the content in the Blogosphere is not tagged. Also, the number of tags for a document is usually less then 10, while actual content itself may contain thousands of words. Therefore, tags generally cannot accurately represent the contents of a document. An additional problem occurs because tags may be subjective or prone to spam.

Known methods and systems base their analysis on tags and search volume and not on actual text content. A more accurate means of examining blogs to determine search relevance is to consider the whole content of the document.

Moreover, known systems and methods additionally fail to account for restrictions on time range (as defined as a temporal window). Moreover, additional search parameters, such as geographical region or demographic information are engaged through an inefficient method reliant upon data associated with a text source which is not consistently available, as is exemplified by U.S. Pat. No. 7,231,405, wherein the invention is reliant upon geocodes.

The systems and methods of GOOGLE ALERTS™ and YAHOO ALERTS™ provide an alerts service whereby users can register a query with the system. Whenever the system (specifically the crawler) encounters a new document containing the specified query, it raises an alert and sends an email to the user. An alert function is also included in U.S. Pat. No. 7,143,118. This service is useful for monitoring specific items on the web, but it suffers from two main problems: (i) an alert is raised whenever any document (e.g., blog post) containing the query is encountered and not when an even to interest occurs; and (ii) if the number of documents containing the specified query is large then this technique will fail, because the number of alerts will be too many to handle.

The system and method of GOOGLE™ utilizes the number of inlinks to a page as a measure of authority. For example, GOOGLE™'s page rank algorithm makes use of such information. This measure has proven its effectiveness over time for web documents. However, this simple definition of authority ignores contextual and time-specific information and hence is generally inadequate for the Blogosphere, or any other temporally-ordered information source. A more informed authoritative ranking would be achieved by taking into account time, context, authority, and geographic information.

The system and method of TECHNORATI™, as well as other search sites, displays a list of "what is popular now" through an application of tags and search volume. There are two limitations to this approach: (i) this is based on search volume and tags and not on the actual content of posts and is therefore undesirable because tagging requires manual effort, the search volume is not always available, and tags are not always accurate representation of actual content; and (ii) the list of popular keywords cannot be generated for arbitrary time periods (e.g., 1 Apr. 2006 to 18 May 2006).

The system and method of GOOGLE TRENDS™ lists of top few cities and regions where the user specified query was most popular (in search volume). This is useful as keywords may have varying popularity across different regions in the world. It would further be useful if a search tool could display a map with regions marked according to the popularity of a search query. However, such a service is not provided by any tool for the case of the popularity of the query in the actual Blogosphere or on the actual content of temporally ordered information sources.

The systems and methods of GOOGLE ANALYTICS™ and CLUSTRMAP™ provide web analytic tools that use map-based visualization to display the number of visitors to visit a site from different parts of world. However, no tool provides such visualization for search results in the Blogosphere.

Known systems and methods apply inverted indexes for the purpose of providing search functionality within text documents. Such indexes suit the traditional web that consists of a collection of HTML documents, but not the new emerging social media. Special techniques are required to conduct efficient searching for attributes such as age, gender, and time of creation that are commonly found in documents in social media. Thus, efficient querying on attributes of a user in conjunction with keyword queries is a persistent problem. For example, conducting a search for all blog posts containing global warming posted in April 2007 by males aged 30-45 and with location within 50 miles of downtown Toronto, is beyond the capability of known technologies. Traditional indexing schemes wherein posting lists are created for each of the keywords in the corpus at the indexing time, and intersection of posting lists is computed at the query time. These work well when constraints on the metadata are absent.

Moreover, known systems and methods, such as those included in U.S. Pat. No. 5,819,260 and U.S. Pat. No. 5,146,405, contemplate means of formulating an additional query based upon the text of a specific document and the implementation of part-of-speech segmentation functionality. However, they achieve the additional query through a method that lacks sophistication and therefore fails to produce a meaningful query.

Finally, known systems and methods routinely apply primitive search interfaces. They lack features such as: one-click zoomable popularity and demographic curves; asychronously loading cached copy of search results in tooltips; automatic text summarization; and collaborative dashboards.

In view of the foregoing, what are needed are methods and systems for information discovery and text analysis of the Blogosphere, or other forms of social media and various temporally ordered information sources, that are not necessarily query driven, and that overcome the drawbacks and limitations of the prior art. For example, a user should be able to monitor posts and keywords of interest that merit further exploration should be automatically suggested.

Further, what is needed is a system and method that does more than solely monitor queries posed by users or blog post tags and rank them based on relative popularity. There is a wealth of related information one can extract from blogs in order to aid information discovery. For example, blog analysis can be a useful tool for marketers and public relations executives as well as others. They can be used, for example, to measure product penetration by comparing popularity of a product along with those of a competitor in the Blogosphere. Moreover, popularity can also be used to assess decisions, like marketing strategy changes, by monitoring fluctuations in popularity.

Additional functionalities, such as one-click zoomable interfaces, tooltips and intelligent alerts through the use of bursts can further enhance Blogosphere analysis. The list includes adding a spatial component to queries as well as correlations identifying temporal dynamics in the list of keywords correlated to a specific keyword, and mapping correlated keywords to topics. These functionalities and features have the potential to improve information discovery and text analysis of the Blogosphere or any other online temporally-ordered text sources.

SUMMARY OF THE INVENTION

In one aspect of the invention a method for searching one or more text sources including temporally-ordered data objects is provided, characterized in that it comprises: providing access to one or more text sources, each text source including one or more temporally-ordered data objects; obtaining or generating a search query based on one or more terms and one or more time intervals; obtaining or generating time data associated with the data objects; identifying one or more data objects based on the search query; and generating one or more popularity curves based on the frequency of data objects corresponding to one or more of the search terms in the one or more time intervals.

In another aspect of the invention, a system for searching a text source including temporally-ordered data objects is provided, characterized in that it comprises: a computer; a search term definition utility linked to the computer or loaded on the computer; wherein the computer is connected via an interconnected network of computers to one or more text sources including temporally-ordered data objects; wherein the system, by means of cooperation of the search term definition utility and the computer, is operable to: provide access to one or more text sources, each text source including one or more temporally-ordered data objects; obtain or generate a search query based on one or more terms and one or more time intervals; obtain or generate time data associated with the data objects; identify one or more data objects based on the search query; and generate one or more popularity curves based on the frequency of data objects corresponding to one or more of the search terms in the one or more time intervals.

In yet another aspect of the invention, a computer program product is provided, characterized in that it comprises: computer instructions made available to a computer that are operable to define a search term definition utility, wherein the computer is linked to one or more text sources including temporally-ordered data objects, wherein the computer program product, by means of cooperation of the search term definition utility and the computer is characterized in that the search term definition utility is operable: to provide access to one or more text sources, each text source including one or more temporally-ordered data objects, obtain or generate one or more time intervals; obtain or generate a search query based on one or more terms and one or more time intervals; identify one or more data objects based on the search query; and generate one or more popularity curves based on the frequency of data objects corresponding to one or more of the search terms in the one or more time intervals.

BRIEF DESCRIPTION OF THE DRAWINGS

A detailed description of the preferred embodiments is provided herein below by way of example only and with reference to the following drawings, in which:

FIG. 3A and FIG. 3B illustrate correlations for keywords "Philip Seymour Hoffman" for periods Mar. 1 to Mar. 20, 2006, and May 1 to May 20, 2006, respectively;

FIG. 4 illustrates an example of "hot keywords" cloud tag for 30 Jul. 2006;

FIG. 11 illustrates geographic search for query "iphone" on Jan. 29, 2007;

FIG. 13 illustrates the interface for showing cached copy of search results in a tooltip. The figure shows one such tooltip which is displaying content of the first search result along with an automatically generated summary. The tooltips are multimedia enable and are capable of displaying images and videos;

FIG. 14 illustrates the interface for query by document; and

FIG. 16 illustrates the display of the results of an indexing scheme for "global warming" wherein time and gender information are analyzed by the search query.

Figure 1A:
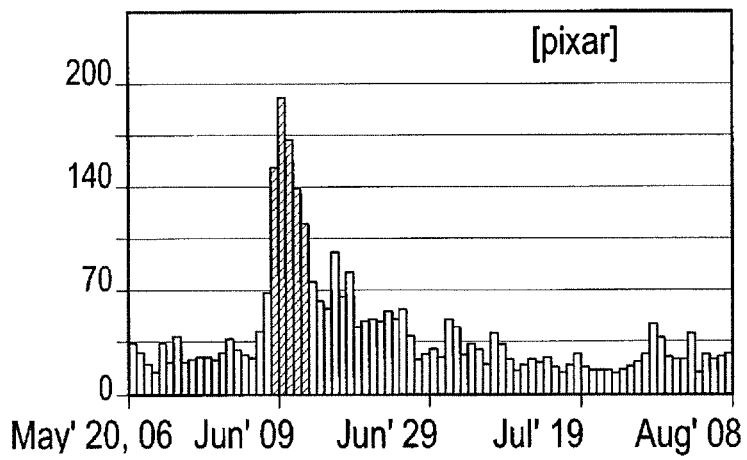
FIG. 1A and FIG. 1B illustrate popularity curves for keywords "Pixar" and "Abu Musab al-Zarqawi", respectively.

In the figures, embodiments of the invention are illustrated by way of example. It is expressly understood that the description and drawings are only for the purpose of illustration and as an aid to understanding, and are not intended as a definition of the limits of the invention.

DETAILED DESCRIPTION OF THE INVENTION

The term BlogScope™ refers to a particular embodiment of the present invention that is a method and system that allows a user to query blog posts through the use of a keyword and that returns information including additional keywords that have a time-relation to the original query. In one aspect thereof, BlogScope employs identifying user information to tailor the query search, and can be further limited by a specified temporal window or geographical location, or both a temporal window and geographical location.

It should be expressly understood that although the discussion herein is confined to blogs and their analysis, the present invention is equally applicable to any text content and specifically to streaming text collection with a temporal dimension. Such sources include weblogs, newsgroup articles, email, forums, news sources, social networking sites, collaborative wikis, micro blogging services, instant messaging services, SMS messages, and the like.

The object of the present invention is a means of producing Blogosphere query results wherein the results produced are the result of an analysis of a popularity curve derived by way of temporally-ordered events that may be displayed as a ranked order of keywords indicating further sources of information on the topic of the query.

The present invention is a method and system for Blogosphere query activity, whereby query results can be limited by blog information, geographical location, a temporal window, or any combination of these elements, and results include time-specific keywords that can be utilized to further analyze a topic and to gather additional information related to the original query. It involves the application of software and hardware, some of which is already known. For example, the display of the query results may be achieved on a computer screen, a handheld device, or any other display means.

It will be appreciated by those skilled in the art that variations of the preferred embodiment may also be practiced without departing from the scope of the invention.

In particular, the present invention provides a method and system for information discovery and text analysis of the Blogosphere or any other text sources with temporally-ordered data objects, such as news, mailing lists, email, forums, newsgroups, and the like. The present invention provides popularity curves and correlated keywords via an online analytical processing-style web interface having navigational capabilities and undertaking intelligent analysis of bursts and correlations.

In one aspect, the present invention is operable to detect and identify bursts (meaning time-specific events of interest) by way of a popularity curve. The data in the popularity curve corresponds to the relative popularity of the query keyword in blog posts or other temporally-ordered text sources. These curves are advantageous for the process of information discovery, as the user can navigate to relevant information in an effortless manner by following the suggestions presented in the form of bursts.

For example, a user could observe a graph displaying the relative popularity of the query keywords "Philip Seymour Hoffman" in the Blogosphere as a function of time and automatically tag regions of time that the search string shows as experiencing unusual or unexpected popularity. These can be temporal regions that one may wish to focus upon and to utilize to refine a search. For this particular query, the keywords "Philip Seymour Hoffman" could display unexpected popularity over the last year in the Blogosphere when the actor was nominated for OSCAR™, when he received the OSCAR™ award and when a subsequent movie that he appeared in was released (MI3™).

From an information discovery perspective, details explaining the 'unusual' popularity of the keywords "Philip Seymour Hoffman" in the corresponding temporal intervals should be automatically provided. Keywords that are highly correlated with the search string in a temporal interval of choice are good candidates for explaining such 'unusual' popularity. For the case of the first temporal interval in which "Philip Seymour Hoffman" shows 'unusual' popularity, the query is closely correlated with the keywords "Capote" (the film he acted and was nominated for an OSCAR™) and "Oscar". For the second temporal interval with the keywords, "Oscar", "Actor", "Capote" and "Crash" (another movie winning an OSCAR™), and for the third the correlated keywords were "Tom Cruise" and "MI3". It is evident that such keywords provide information as to why the query might show relatively 'unusual' popularity in the corresponding time interval thereby indicating an event of interest.

It should be noticed that such correlations between keywords can be repeatedly discovered, possibly triggering additional information discovery. For example, one might choose to identify the keywords correlated with both "Philip Seymour Hoffman" and "Capote" in the first temporal window.

Such functionality would enable a finer exploration of the posts in the temporal dimension. Essentially, it would enable a more focused drill down in the temporal dimension.

In another aspect, the present invention may provide an alert means for indicating when a potential event of interest occurs, as indicated by a burst in the popularity curve.

In yet another aspect, the present invention, given a search query with a time interval and optionally a geographic region, may be operable to generate an automatic burst synopsis. Such a synopsis includes a set of keywords that explain information related to the query for the associated burst.

In another aspect, the present invention may provide bursts for authoritative ranking of the temporally ordered information source. Authoritative rank of a blog depends on the context (meaning the query the burst is associated with) and the associated time interval (meaning the temporal window). An authoritative blog is a blog that reported the event (the event is described by the burst synopsis set and the blog contains all keywords in the synopsis set) and is most cited in the specified time interval. Blog posts that contain the burst synopsis keywords are ranked by citations. Citation includes both links to this blog and also the number of quotations or references by other blogs to this blog in the specified time interval.

In another aspect, the present invention may be operable to efficiently identify correlated sets of keywords in association with the keywords of a query search. To provide a quick overview of a topic, an analysis tool displays a list of keywords closely related with the searched query in a selected time interval and geographic region. Such correlation between keywords can be defined based on either their co-occurrence information or based on the similarity between their popularity curves. Similarity between popularity curves can be quantified by any metric used to assess closeness of curves. Preferably, the correlated keywords are aware of temporal and spatial restrictions present in the search query. Thus, correlations are computed within a specified temporal or spatial scope. Such computation can be performed online, based on pre-computed information or achieved through other means.

The list of correlated keywords is used for navigation of the Blogosphere. Elements of such navigation include the use of correlated keywords to refine the search, drilling down or rolling-up on the search results with a specified temporal or geographical range. This list of correlated keywords can also serve as a navigational interface, allowing a user to refine the search or explore further.

In another aspect, the present invention may use actual text content for the purpose of analysis (e.g., for the purpose of computing correlated terms and popular keywords). The present invention provides for the identification of popular keywords (commonly known as hot keywords) from the content of the post, without requiring tags or search volume. It also can utilize text content in conjunction with tags, search volume or both elements together for the purpose of analysis.

In another aspect, the present invention may provide query capability for popular keywords using arbitrary time ranges. Specific algorithms are operable to conduct efficient query responses.

In yet another aspect, the present invention may provide a map for depicting different geographic regions and popularity of a user's query in the Blogosphere. Authors' profiles can also be used to gather location information from blogs, and this information can be applied to restrict a search to specific geographic regions.

One aspect of the invention is a method of analyzing the Blogosphere. The analysis method facilitated by the invention is segmented into three steps: (i) identification of topics of interest to the user through the creation of a query utilizing keywords (what is interesting); (ii) identification of events of interest (when is it interesting); and (iii) identification of the reason an event is interesting (why is it interesting).

In one embodiment of the invention, a list of "interesting" keywords is displayed on a webpage or other electronic medium. Based on this list, a user can formulate a query to seek for relevant blog posts.

To enable the first step of analysis, the present invention employs a simple text query interface, to identify data objects, which may be blog posts, relevant to a query, in case a user is seeking specific information. Once one or more terms, or keywords, of interest are identified, a search query is formed and relevant blog posts are retrieved.

As the second step of the analysis of the invention, the popularity of the query terms or keywords in the data objects is plotted as a function of time. The invention intelligently identifies and marks interesting temporal regions as bursts in the keyword popularity curve.

The final step of the analysis of the invention can collect one or more additional terms associated with the data objects of interest, known as correlated keywords (intuitively defined as keywords closely related to the keyword query at a temporal interval). Such keywords aim to provide explanations or insights as to why the keyword experiences a surge in its popularity and effectively aim to explain the reason for the popularity burst. Based on these keywords, one can refine a search and drill down in the temporal dimension to produce a more focused subset of data objects.

In one embodiment of the invention the search results may be displayed on a webpage with snippets and links to full articles or blog posts.

In another embodiment of the invention a user can choose between a standard and a stemmed index. The standard index conducts searches for exact keywords. For example, when searching with a standard index for the results of the query "consideration", all articles containing the term "consideration" will be returned. However, when searching with the stemmed index, all English words are first converted to their roots, and hence a query search for the term "consideration" will return articles containing either of "consider", "consideration", "considerate" or "consideration".

The method and system of the present invention are best understood as a means for providing the specific functionality as particularized below. Embodiments of the invention may include different combinations of the functionalities described below.

Popularity Curve

One aspect of the invention is a popularity curve for a keyword or set of keywords. A popularity curve displays how often a query term is mentioned in the Blogosphere during a particular temporal window. The popularity curve and its fluctuation provide insight regarding the popularity of the keyword and augmentation or diminishment of this popularity over time.

Figure 1B:
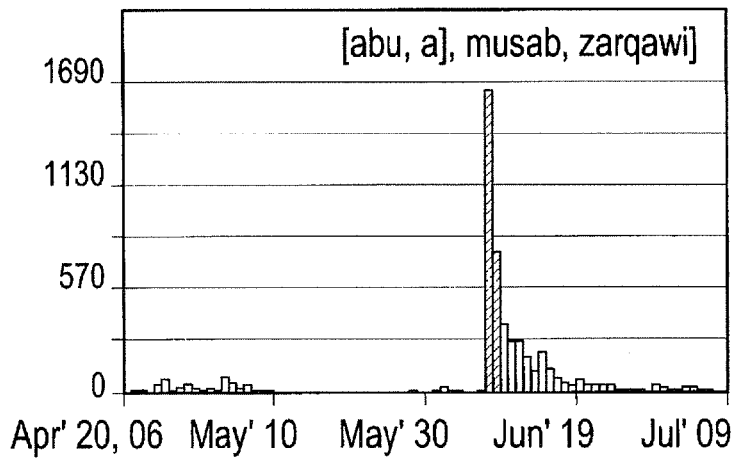

FIG. 1A and FIG. 1B provide examples of popularity curves for the queries "Pixar" and "Abu Musab al-Zarqawi", respectively. Note that the movie "Cars" by Pixar was released on 9 Jun. 2006. Abu Musab al-Zarqawi, a member of Al-Qaeda in Iraq, was killed in a U.S. air strike on 7 Jun. 2006. Regions where an augmented popularity occurs are known as bursts.

Utilizing the popularity curve function of the present invention, one can compare the popularity of various keywords. Closely related keywords will generally have very similar popularity curves, at least for the temporal interval when the keywords are related. Hence, comparison of such curves provides an alternative approach to the analysis of the temporal relationship between keywords.

Figure 2:
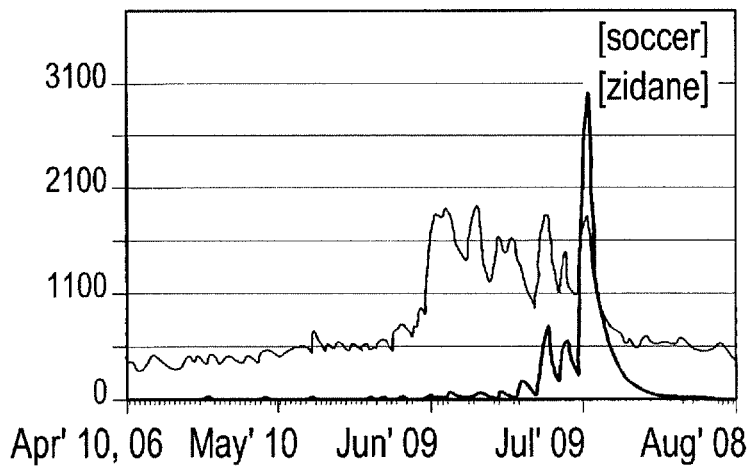
FIG. 2 illustrates popularity comparison curves for keywords "soccer" and "Zidane"

FIG. 2 displays the popularity of keywords "Zidane" and "soccer". Notice that the keywords exhibit strong similarity in their popularity for a short temporal period. The relevant temporal window spans a few days before the world cup final match with a peak the day of the match. The peak, or burst is due to the incidents occurring during the final match related to the player Zinedine Zidane.

Popularity curves can be a useful tool for marketers and public relations executives as well as others. They can be used, for example, to measure product penetration by comparing popularity curves of a product along with those of a competitor in the Blogosphere. Popularity curves, when coupled with the semantic orientation of the associated blog posts, can provide tremendous insight for one product's popularity in relationship to another. Popularity curves can also be used to assess decisions, like marketing strategy changes, by monitoring fluctuations in popularity (e.g., as a result of a marketing campaign).

In one embodiment of the invention popularity curves may be further enhanced through the addition of a one-click zoomable interface for restricting the search to specific temporal intervals. Clicking on any region on the popularity curve image leads to another search with a restricted temporal range. For example, clicking on any bar in the FIG. 1A will initiate a query for any document containing "pixar" from the selected time range.

Keyword Bursts

Another aspect of the invention is keyword bursts. Blogging activity is uncoordinated, in that it is produced through the work of unrelated individuals producing works relating to topics chosen at their individual discretion. However, whenever an event of interest to a contingent of Bloggers takes place (e.g., a natural phenomenon like an earthquake, a new product launch, etc.), multiple Bloggers write about it simultaneously. Increased writing by multiple Bloggers results in an increase in the popularity of certain keywords. This fact allows the present invention to intelligently identify and mark an event of interest on a popularity curve based on the production of a large quantity of blog content related to a specific event. These events are referred to herein as bursts.

According to the present invention, a burst is related to an increase in popularity of a keyword within a temporal window. Bursts play a central role in analysis and blog navigation of this invention, as they identify temporal ranges to focus upon and drill down into, for the purpose of refining a query search. FIG. 1A and FIG. 1B each show an example of a burst.

Bursts can be categorized as one of two main types: anticipated or surprising. Popularity for anticipated bursts increases steadily, reaches a maximum and then recedes in the same manner. For example, the release of a movie and the period of a soccer world cup tournament both fall under this category. Unlike anticipated bursts, popularity for surprising bursts increases unexpectedly. For example, Hurricane Katrina and the death of Abu Musab al-Zarqawi both fall under this category.

In another embodiment of the invention, bursts can be used to produce intelligent alerts for users. Subscribing to specific keywords, the present invention could generate an alert (in the form of email) only when a burst occurs for specific keywords in a temporal window. This way an alert will be raised only when something potentially interesting as defined by specific keywords occurs rather than whenever a new page containing query terms is discovered.

Keyword Correlations

Another aspect of the invention is keyword correlation. Information in the Blogosphere is dynamic in nature. As topics evolve, keywords align and links are formed between them, often this occurs to form stories. Consequently as topics recede, keyword clusters dissolve as the links between them break down. This formation and dissolution of clusters of keywords is captured by the present invention in the form of correlations.

In an embodiment of the invention the result of the query search may be a list of terms or keywords found in blog posts most closely associated to the search query terms. These terms associated with the data objects of interest represent keyword correlations and are representative tokens of the chatter in the Blogosphere. Keyword correlations can be used to obtain insight regarding blog posts relevant to a query. Moreover, provided that users navigate by drilling down to posts related to a burst, such correlations can be used to reason why a burst occurred.

Keyword correlations are not static. They may change in accordance with the temporal interval specified in the query. This effect is especially relevant in an embodiment of the invention wherein a user can specify a temporal range for which a list of keywords correlated to query keywords is to be produced.

FIG. 3A and FIG. 3B show screenshots of keyword correlations for "Philip Seymour Hoffman" for two different time periods: 1 Mar. 2006 to 20 Mar. 2006 and 1 May 2006 to 20 May 2006, respectively. Hoffman won the OSCAR™ award for best actor for the movie Capote on 5 Mar. 2006. MI3 starring Hoffman was released on May 5th. As it can be seen, correlations are different for different temporal intervals, and they reflect the events that occurred during a particular interval. Choosing one of these keywords, for example "Capote", causes a list of keywords correlated to "Philip Seymour Hoffman" and "Capote" in the temporal range specified to be produced, along with the associated popularity curve for the pair of keywords.

In another embodiment of the invention, keyword correlations are employed to provide an exploratory navigation system. A user can easily jump from a keyword to related keywords and explore these by following correlation links. This path leads to a greater wealth of information relating to a query to be gathered.

Hot Keywords

Yet another aspect of the present invention is a list of "hot keywords" which are one or more terms generated from a prior search query, such as one that was automatically generated within a specific time interval, such as 24 hours. Keywords are measured to ascertain a level of "interestingness" as evidenced by the rate of use of keywords within a time interval, or temporal window. Those keywords that meet or exceed the set measurement are deemed hot keywords and are ranked.

In one embodiment of the invention, the highest ranking keywords according to this measure, are displayed on a webpage having a font-size proportional to the measure of interestingness. Thus, the most interesting (meaning the most frequently used) keyword will be displayed in the largest font-size, whereas the least interesting keyword (meaning the least frequently used) will be displayed in the smallest font-size, and all other keywords will be displayed in font-sizes that correspond to the position of the particular keyword between the largest and the smallest font-size keywords, so that the font-size of the keywords reduces in size from the largest and to the smallest font-size and in a manner that is relative to the font-size used in the keywords prior to and after each keyword. Of course the order of the font-sizes may also be inverse of the order here described.

FIG. 4 shows an example screenshot of a ranking of keywords deemed "hot keywords" on 30 Jul. 2006.

The list of hot keywords is intended to offer guidance to the analysis process. The present invention provides a rich interface whereby a user can specify a temporal range (e.g., 1 Mar. 2006 to 31 Mar. 2006) and set a threshold of "interestingness" (meaning a minimum level of frequency of use of said keyword in blog posts) to generate a list of hot keywords for that temporal range. The result allows for analysis of past data.

In one embodiment of the invention hot keywords are displayed in a cloud tag.

Spatio-Temporal Search

Another aspect of the invention employs a keyword search that incorporates spatio and temporal elements into the function of the analysis engine.

It should be understood that generally speaking there are important properties of the Blogosphere that cannot be easily captured by the ranking model of a traditional web search. For example, documents on the web do not have a time-stamp associated with them, while blog posts have information regarding the time of creation linked thereto. Known methods of web-based query searches do not adequately capture the time data of a blog. For example, simple relevance-based ranking using tf·idf ignores the temporal dimension, and pure temporal recency-based ranking is also flawed. As a first attempt to address the ranking of search results in the Blogosphere, the present invention employs a combination of both relevance based and temporal recency-based methods to rank search results.

In yet another embodiment of the invention, demographic information consisting of age, gender, geographic location, industry, etc. relevant to the author of each post can be associated to a query. This information is utilized to stream-line the results of a search query.

In still another embodiment of the invention, a user has the option to request that the blog post results displayed be limited to a specific temporal interval, or a selected demographic group, a geographical location, or any of these options.

FIG. 11 displays a screenshot for a geographical search. Users can restrict viewing by selecting countries or cities on the map by a simple click on any dot on the map and drill down to the blog of a geographical region.

Figure 12A:
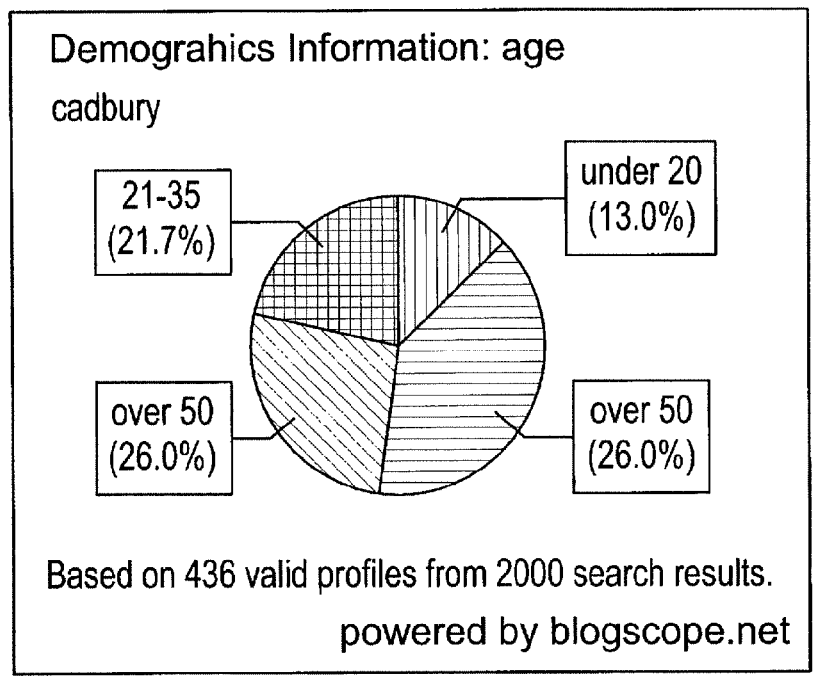
FIG. 12A illustrates a demographic curve for age distribution of individuals writing about Cadbury.

FIG. 12A displays age distribution of individuals producing content relating to Cadbury.

Figure 12B:
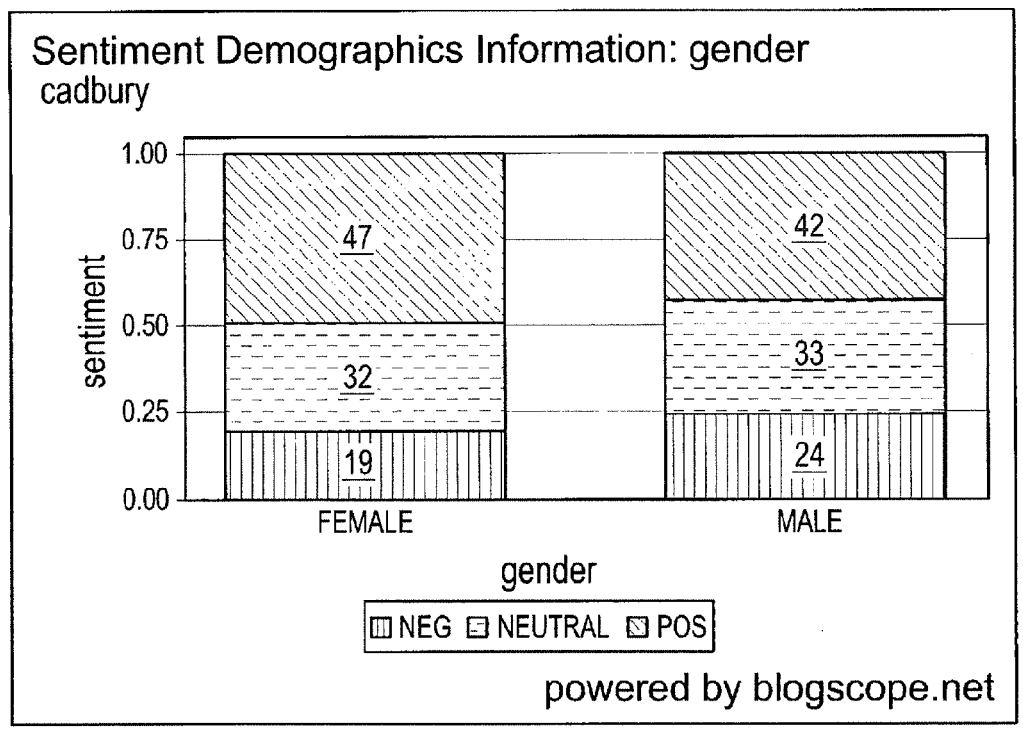
FIG. 12B illustrates a demographic curve for gender distribution of individuals writing about Cadbury segmented based on sentiment information.

FIG. 12B displays another demographic curve, one generated from sentiment analysis. One region in the graph (30) represents negative sentiment; another region (40) represents positive sentiment; and the final region (50) represents neutral. Sentiment classification is performed using a pre-trained classifier.

In one embodiment of the invention, segments of the screen display may be clickable, in a one-click manner, to allow for drill down analysis. FIGS. 12A and 12B incorporate regions in a pie-chart that are clickable.

In another embodiment of the invention, other types of data associated with blog posts may be collected to limit the query search. For example, if instead of blog posts, the present invention warehouses financial information or news, such textual information will be associated with a source (e.g., REUTERS™, THOMPSON FINANCIAL™, BLOOMBERG™, etc). This information is recorded by the present invention and results can be suitably restricted to a source, industry category, as well as other metadata associated with a site, or a collection of these types of metadata.

Authoritative Blog Ranking

Other aspects of the present invention include burst synopsis sets and a ranking in accordance with the authoritative nature of the data object as indicated by the data associated with the data object.

In one embodiment of the invention the burst synopsis set for an initial query may be indicated by (q). Thus, q represents the maximal set of keywords that exhibit burst behaviour in the associated popularity curve. Synopsis sets may have an arbitrary size (meaning inclusion of an unbounded number of keywords) provided that all included keywords contribute to the burst.

Consider the query "italy"; blog posts may mention the keyword "italy" in connection to both soccer and political events. All such data objects, or blog posts, contribute to the popularity of the keyword "italy". The keywords "soccer" and "politics" are both correlated to keyword "italy" in the associated temporal interval. However, expanding the search and observing the popularity curves of "italy, soccer" and "italy, politics" shows that only the curve for "italy, soccer" has a burst in the temporal interval of the three summer months of 2006. The present invention can automatically generate synopsis keyword sets for a burst. In this case, only the set "italy, soccer" will be identified and suggested by the present invention as a synopsis set, associated with the initial keyword query "italy". Notice that the set "italy, politics" will not be identified as a synopsis set, because "italy, politics" does not have a burst during June 2006 in the corresponding popularity curve.

Based on synopsis keyword sets, the present invention may automatically rank blog posts related to the synopsis set based on authority.

Thus, in an embodiment of the invention authoritative blogs may be utilized to rank query results. Authoritative blogs are blogs that are read by a large number of readers, and are usually first to report on certain news. These blogs play an important role in the dissemination of opinions in Blogosphere. Moreover, authoritative blogs are the ones that gave rise to the burst on the synopsis keyword set. These are blogs that are relevant to the synopsis set, temporally close to the occurrence of the burst and most linked in the Blogosphere.

As an additional example, a search using query "cars" on 9 Jun. 2006 results in the synopsis set {cars, pixar, disney, movie} which disambiguate the burst resulted from the release of the movie Cars, from general discussion about automobiles in the Blogosphere. Such set is accompanied with authoritative blog posts that were the first to report the event and were most linked in the Blogosphere. Additional information can be incorporated in addition to link information from the Blogosphere. Such information includes data regarding the activity of the Blogger (such as frequency and size of the contributed content), activity in the comments section for the blog, information obtained by analyzing the language of the contributed information, such as that obtained from readability tests. This aspect of the invention is derived from the work of Jenkins and Paterson (see Farr J. N., Jenkins J. J., Paterson. D. G. (1951), *Simplification of Flesch Reading Ease Formula*, Journal of Applied Psychology).

Query by Document

Another aspect of the present invention is a query paradigm Query by Document ("QBD"). Commonly one is interested in identifying reactions in the Blogosphere resulting from news sources or other media reports on events. The QBD system and method allows for the generation of a query upon the basis of the content of a chosen source document.

In an embodiment of the invention, any text document may be utilized as the source document for input, such as a news article, an email message, or any text source of interest to the user. The present invention automatically processes the document, and constructs a search query tailored to the contents of the input document. This query is subsequently submitted to the present invention, or any other search engine of interest, for the purpose of identifying documents relevant to the query document.

In one embodiment of this invention, the user may be provided with the ability to specify the degree of relatedness desired between the query document and the results. The degree can range from highly specific relatedness (meaning only documents referring specifically to the content referenced in the query document are to be included in the search results) to very general relatedness (meaning documents referring to concepts mentioned in the query document will be included in the search results).

Figure 14:
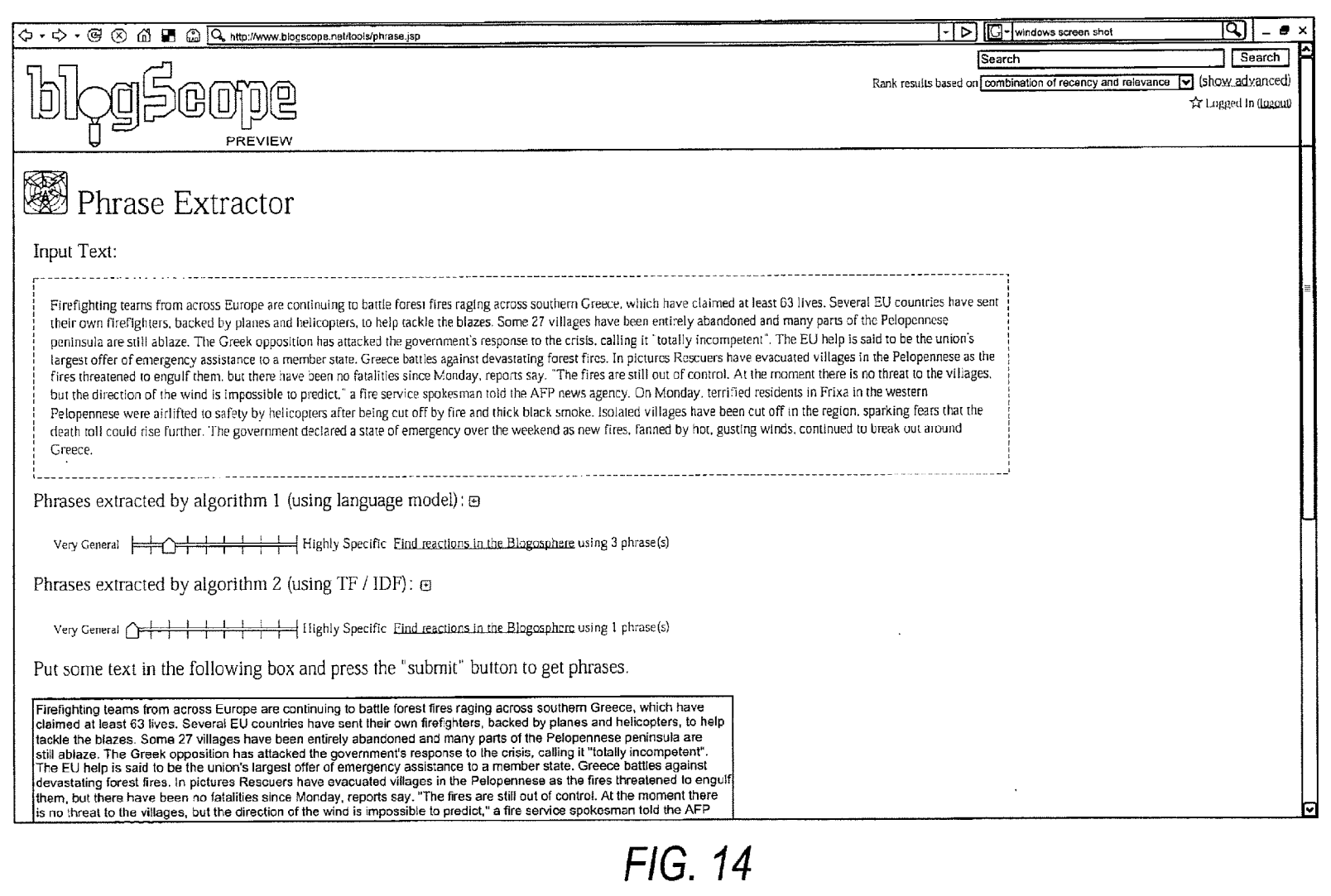

FIG. 14 shows a screenshot of the QBD interface. The figure depicts that the user can submit a text document which results in the construction of a search query. The input text is an article from New York Times relating to the fires occurring in southern Greece in 2007. A slider is presented to control the nature of the constructed query and set relatedness at a level between highly specific and very general. Clicking on "Show reactions in the Blogosphere" will retrieve articles related to the event (namely the fires in Greece) from the data.

In one embodiment of the present invention, a one click paradigm is utilized to initiate and perform a QBD.

BuzzGraphs

Another aspect of the present invention is automated tools to identify and characterize the important information and significant keywords that are the results of a query. This feature handles the large amounts of information generated in the Blogosphere and displays it in an easily understandable format.

In one embodiment of the invention graphs, called Buzz-Graphs, may be produced to visually depict the query results. BuzzGraphs aid a user in understanding the most important events of interest. Moreover, BuzzGraphs express the nature of underlying discussions occurring in the social media space related to the query. Two types of BuzzGraphs are supported, namely query-specific and general BuzzGraphs.

Query-specific BuzzGraphs may be used to characterize the nature of social media space discussions and identify information related to a particular query. When a user submits a query the present invention automatically identifies all relevant results and analyzes them, identifying all statistically significant associations (meaning correlations). Correlated keyword pairs can be displayed in a BuzzGraph. A connection (also known as an edge) between two keywords in the BuzzGraph signifies an important correlation between these keywords. Since the number of such correlated keywords pairs can be large, the present invention utilizes information about the importance of such keywords (expressed via popularity ranking measures) and ranks correlated pairs by aggregate importance. Only a user-specified number of important associations are displayed in the BuzzGraph. This graph can be furthered studied to reveal important associations between keywords in the context of the query issued by a user. The present invention provides its users with the ability to selectively choose keywords from this graph, to engage in further queries, and to drill down to specific events.

Figure 15:
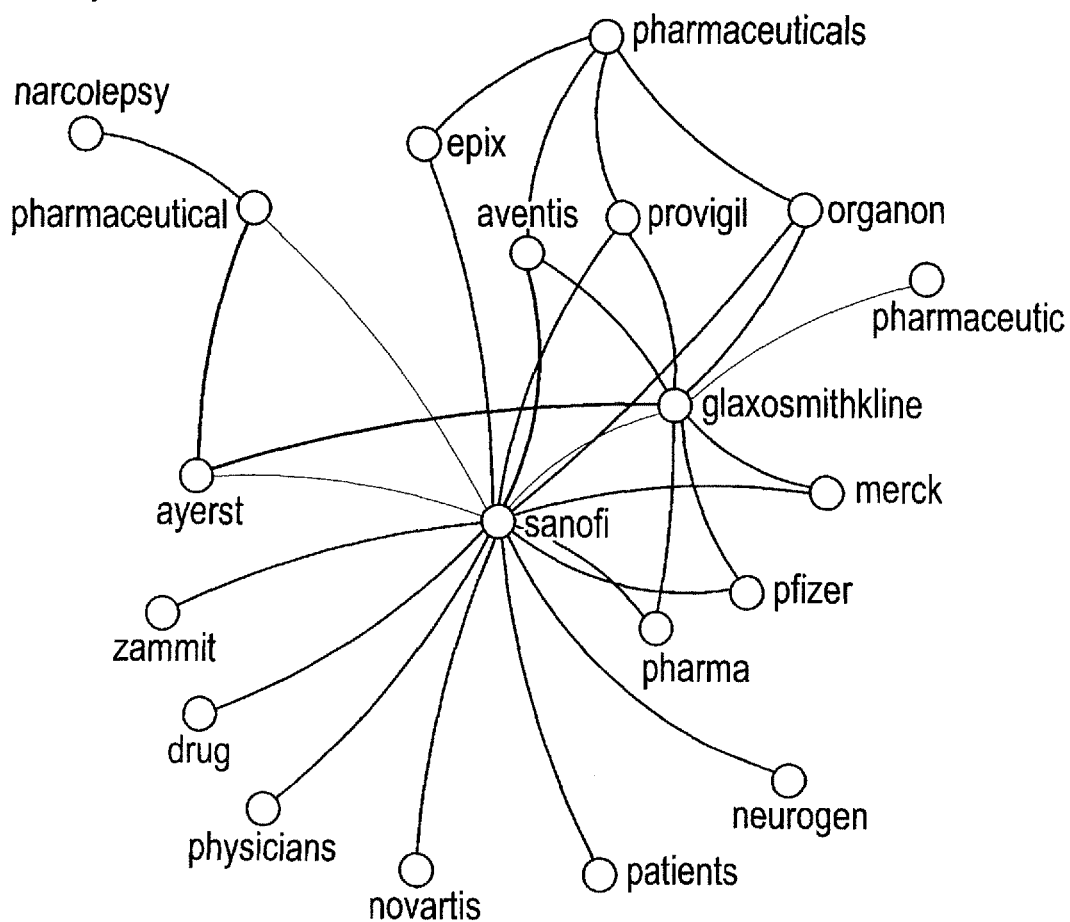
FIG. 15 illustrates a BuzzGraph for query "cephalon" showing all other keywords related to Cephalon.

FIG. 15 presents an example of the BuzzGraph for the query "cephalon" generated by the present invention. This figure summarizes the buzz around the query by displaying both related keywords and the association of each keyword to the query terms.

In another embodiment of the invention the BuzzGraph can be enhanced by the use of sentiment analysis and the inclusion of sentiment information. Initially each search result is classified as being of positive or negative sentiment and subsequently two different BuzzGraphs are constructed. This functionality is useful to gain insight regarding positive and negative keywords relating the search query. The positive and negative keyword results can then be compared and analyzed to produce additional information relating to the query.

Another type of BuzzGraph produced by the present invention aims to reveal important chatter and discussion during a specific temporal interval for a specific demographic group. In this embodiment, no keyword query is provided. The user in this case submits information about a target demographic group (e.g., "males aged 18-30 from New York City blogging about Politics"). All information collected from the specific temporal interval belonging to the specific demographic interest group is processed. The most significant keyword associations are identified and the results are visually displayed as a graph. This graph shows information which is deemed interesting occurring during the specific temporal interval for the specified demographic interest group in the form of keyword clusters. A user can inspect this graph, selectivity focus on keyword clusters of interest and use these keywords to construct search queries for further exploration.

Interface

Another aspect of the present invention is a simple, intuitive interface. Popularity curves provide On Line Analytical Processing ("OLAP") style drill down and roll-up functionality in the temporal dimension. Outlinks on keyword correlations constitute a network of guided pathways to assist the user in a journey of Blogosphere exploration.

In one embodiment OLAP analysis using the present invention can be summarized as a four step process:
1. Keywords are selected by a user for analysis. The present invention supports ad hoc keyword queries and it can also suggest keywords through the use of the hot keyword facility. Furthermore, interfaces may be applied that restrict search results according to several attributes, such as age, location, profession and gender. Profile information regarding Bloggers is automatically collected and is presented to the search interface.
2. The search results can be observed in a visual display as snippets shown on-screen in a webpage. The search results are ranked using the present invention's ranking function, the associated popularity curve of the keyword searched and its correlated keywords. Demographic curves may be utilized to gain insight regarding demographic groups of interest. Moreover a spatial region may be selected to restrict the search to a specific geographic location.
3. The popularity curve data may be expanded or collapsed by selecting regions of the curve. Selection may be achieved through use of a mouse, or alternatively through a touch-screen application, or any other means of user interaction. Through this means a user may select a time interval to be analyzed based on identified bursts. A synopsis keyword set can be generated as well and blog posts may be ranked using authoritative ranking.
4. Correlated keywords and the BuzzGraph may be generated and utilized to derive additional information from a burst. Outlinks on keyword correlations can also be used to refine the query or explore its aspects further through drilling down.

In one embodiment the present invention may utilize well-known machine learning algorithms and natural language processing techniques to undertake a sentiment analysis and automatically assign sentiment data to each data object, either positive or negative, by defining or obtaining positive or negative terms, or keywords, relating to the data objects, inferring the sentiment data from the presence or absence of such positive or negative terms, and based on such sentiment data defining additional information for a search query. As a result it automatically generates charts, such as BuzzGraphs, displaying the sentiment in the Blogosphere for all results of a query in the specified time period. Such graphs are interactive and can be selected to identify all posts with the particular sentiment for each demographic group of interest.

Graphs, as displayed in FIG. 1, FIG. 11 and FIG. 12, are clickable to allow drill-down to refine a search.

As shown in FIG. 13, in another embodiment of the invention a complete content of search results prepared by the present invention search engine, can be visualized conveniently in the form of asynchronously loading tooltips without having to navigate away from the search page. This functionality is implemented by creating a floating DIV element on the search page to display the contents. This functionality is known and is available as part of Javascript widget toolkits for Ajax development.

The tooltips may be multimedia enabled, allowing users to view images and videos inside the tooltip. The summary of the text document, readability index, and sentiment information are also displayed in the same tooltip for reference purposes. Although the creation of a tooltip is known, the use of tooltips to display the cached content of search results annotated with sentiment and readability information is novel and unique to the present invention.

Each of the afore-referenced functionalities are supported by the system architecture of the present invention. It is the combination of the method and system of the present invention that enables it to track millions of blogs, comprise hundreds of millions of articles in its database, and fetch over 500 thousand posts in a twenty-four hour temporal window. Given the scope of the system architecture of this invention, the techniques employed must be computationally efficient. Accordingly, fast and effective algorithms and simplicity are the main focus of the system architecture design.

Figure 5:
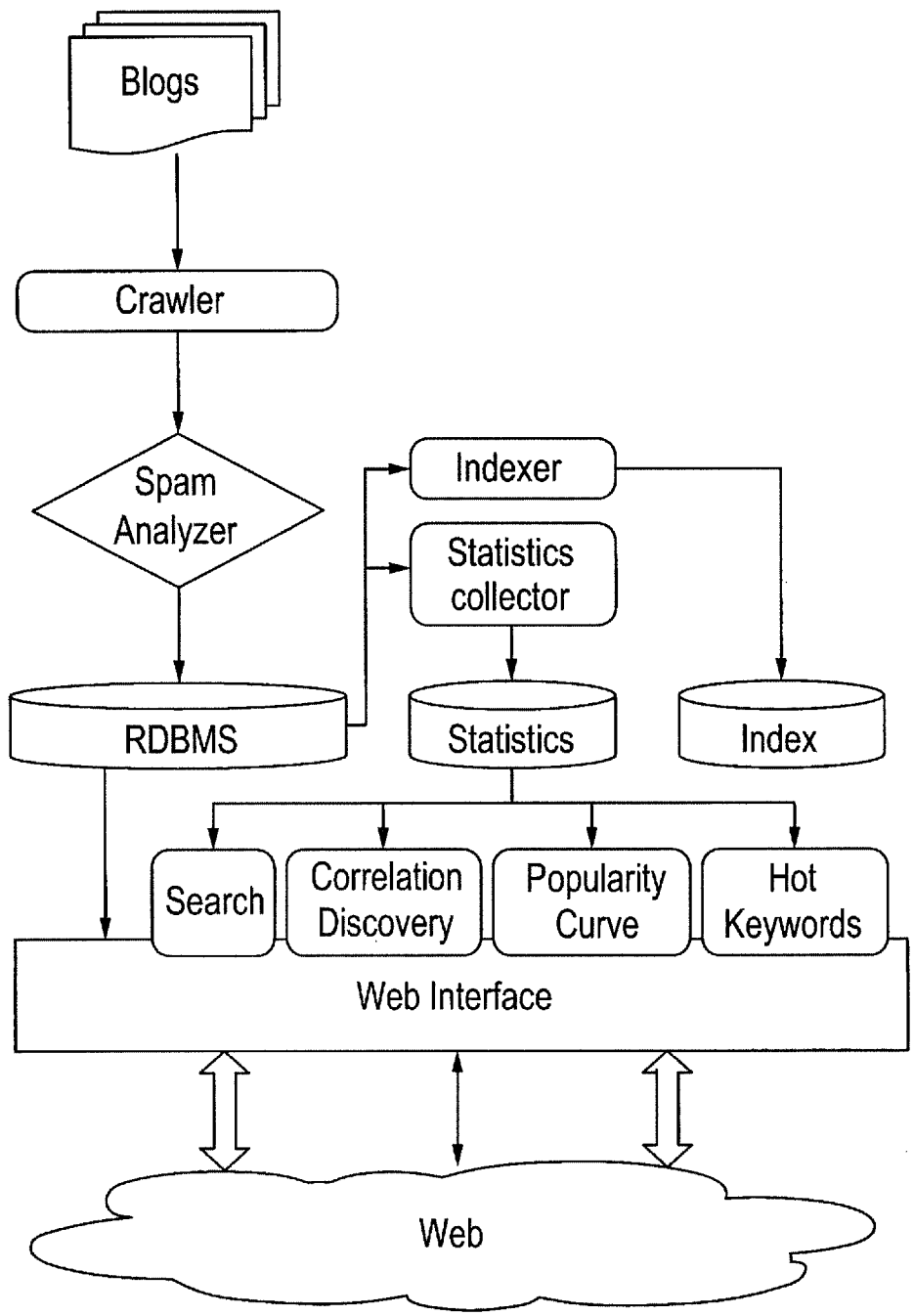
FIG. 5 illustrates high level system architecture for the present invention.
Figure 6:
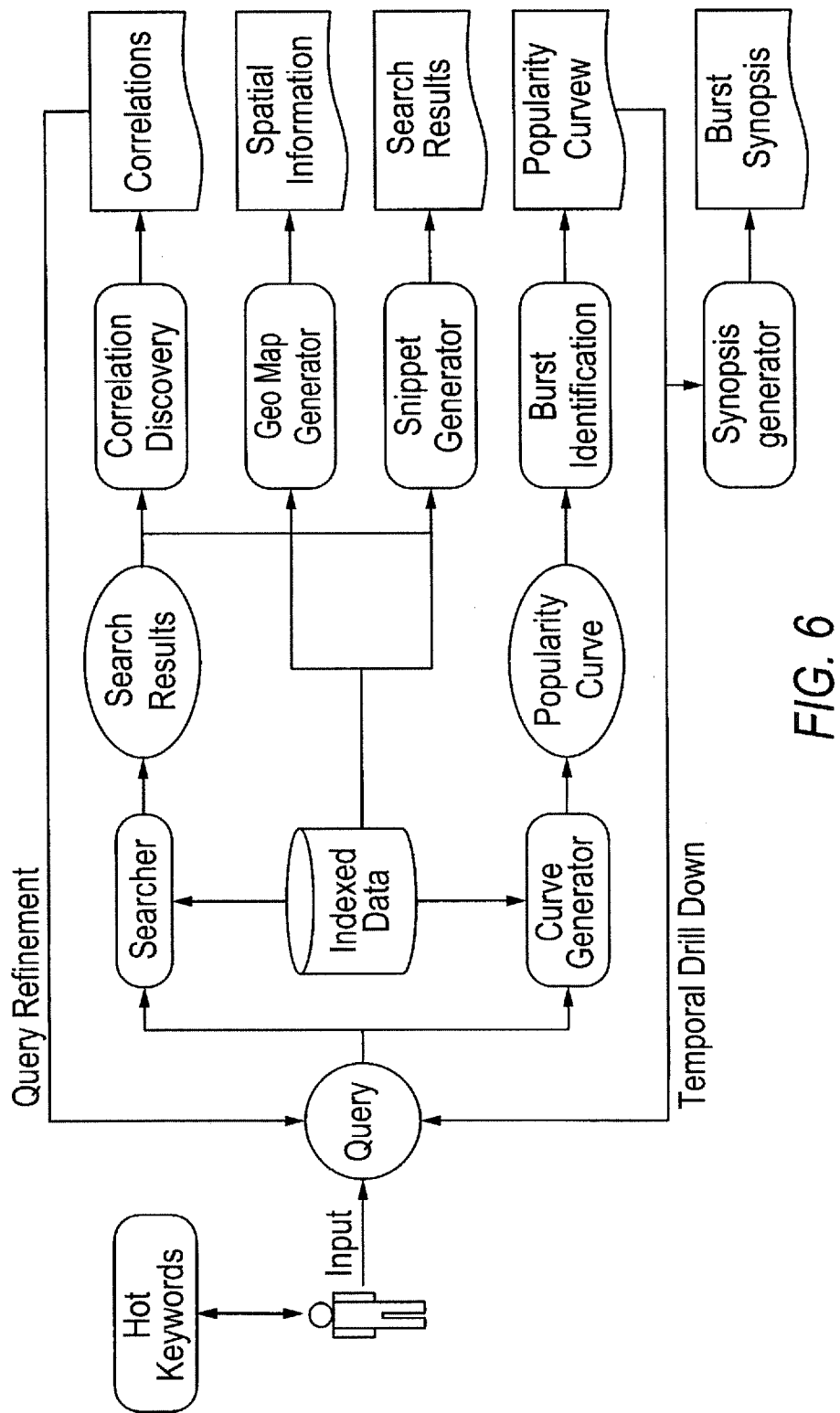
FIG. 6 illustrates various components of the query execution engine and their interaction.

FIG. 5 represents an embodiment of the overall system architecture of the present invention which comprises: a data object source, namely a blog source; a search term definition utility, such as a crawler; a spam analyser; a database, such as a relational database having data which can be indexed and converted to statistics through the application of statistics and index software applications; a web interface that facilitates the search, correlated keyword discovery, popularity curve generation, hot keyword identification, and displays the search results to a user. FIG. 6 describes an embodiment of query execution flow and user navigation.

In one embodiment of the invention the inverted index may consist of lists of data objects, such as blog posts, containing each search term, or keyword, Relational Database ("RDBMS") stores complete text and associated data for all data objects, and IDF stats include idf values for all search terms.

Elements of the system architecture employed in embodiments of the present invention are described in detail individually.

Crawler

One aspect of the present invention is that it acknowledges that the search term definition utility, may be a crawler, and that searching the Blogosphere via a crawler is different from the method employed in web crawling. A data feed, such as a RSS feed, is available for most blogs, and the crawler can fetch and parse the data feed, such as RSS XML, instead of HTML. There is no need to follow outlinks because services like blogs and weblogs maintain a list of recently updated blogs.

In one embodiment the invention applies a crawler that receives from weblogs a list of blogs updated during a specific time period, such as the previous 60 minutes. This list is compared to the list of spam blogs in the database of this invention, and additional fetches are scheduled for those blogs not included in the spam blog database.

One embodiment of the invention may fetch RSS XML blogs from Blogspot but other hosting service resources may also be utilized.

Once a scheduled data feed, such as a RSS feed, is fetched, the data feed collected during the specified time period, such as the previous 12 hours, may be stored in the database. As a result all newly collected articles will be stored in the database. The addition of delay to the fetch process may be applied, as it is a known method applied by many machine created spam blogs. The delay works to reduce network access as the fetch only occurs once even when more than one article is posted on a blog in the specified period of time, such as 12 hours.

Spam Removal

Another aspect of the present invention is a means of removing spam. Spam is a very big problem in the Blogosphere. For example, approximately half the blogs accessible via Blogspot.com data are spam. These blogs exist to boost the page ranking of some commercial websites. Software is available that has the capability to create thousands of spam blogs within 60 minutes of time.

The sophistication of spamming techniques is increasing in intricacy and consequently the task of spam detection is simultaneously becoming more difficult. Language modeling techniques are used to generate sentences that are not just random strings but sensical. Some techniques applied by spammers are sufficiently sophisticated that they at least initially can confuse a human observer.

In one embodiment the present invention's spam analyzer can build upon known techniques, utilizing a Bayesian classifier (see: M. Sahami, S. Dumais, D. Heckerman, and E. Horvitz. A Bayesian approach to filtering junk e-mail, in *AAAI-98 Workshop on Learning for Text Categorization*, pages 55-62, 1998) in conjunction with many simple, effective heuristics.

For example, spam pages contain a large number of specific characters (e.g., "-" and numerals) and contain certain keywords like "free", "online" and "poker" both in their URLs as well as in the URLs of outgoing links. Capitalization of the first word of a sentence is often incorrect or inconsistent in spam pages. Images are almost never present on spam blogs.

The spam analyser of the present invention, utilizes these known techniques of spam identification to differentiate spam from blogs. Spam is then ignored by the system architecture and is not included in the blog analysis.

Searching and Indexing

Another aspect of the invention is that the search term definition utility, which may be a crawler, stores all of the data it collects in a relational database. This data can be indexed to generate inverted lists and other statistics. Two types of indices may be maintained on all posts: namely standard and stemmed. Standard index maintains inverted lists for all tokens in the database. The stemmed index first converts all words to their roots, and maintains lists for all stemmed tokens. These indices form the core of the analysis engine.

In one embodiment of the invention a list of posts for a period, such as 24 hours, may be maintained.

In yet another embodiment of the invention, a separate data structure may be utilized to maintain term frequencies for a period of time, such as a twenty-four hour period, and inverse document frequency over a period of time, such as a 365 day temporal window, for all stemmed tokens.

As has been mentioned previously, all text documents indexed by the present invention may be annotated with metadata information such as time of creation, location of the author, age of the author, and gender of the author. In one embodiment of the invention, the indexing scheme may capture the metadata associated with the document, and this information may be optimized for rich queries containing both keyword and metadata based constraints.

In one embodiment of the invention the system may apply the following method to undertake metadata analysis. Let d denote a document in the corpus C. Let f in F be a metadata feature (e.g., latitude, longitude, time of creation, etc.). Denote the domain of feature f by Df (the terms "feature" and "metadata attribute" are used interchangeably for the purpose of describing this invention). The domain of features is bounded and quantized (e.g., age comes from the domain $\{1, 2, \ldots, 100\}$). For time attribute a fixed granularity, say a day or an hour, is applicable and each document is associated with an integer to represent the time information. For domains like latitude and longitude, a granularity restriction may be imposed, such as one place after decimal, to get the quantized domain $\{0.0, 0.1, 0.2, \ldots, 359.9, 360.0\}$. The domain Df may or may not have a natural ordering. Features like time and age have a well defined ordering, while categorical attributes, such as language of the document or sentiment orientation, do not.

The query q contains a small set of tokens and restriction on all or some of the metadata features. The restriction of a feature f can be expressed as a point query (e.g., value (rating)=7.0). If the domain of f has a well defined ordering, then the restriction can contain a range (e.g., value(latitude) in [18.0, 21.0] AND value(longitude) in [143.1, 145.9]).

In traditional system architectures, a posting list for each keyword token t is maintained. For each feature f, |Df| posting lists are maintained (see: *Mining the Web: Discovering Knowledge from Hypertext Data* by Soumen Chakrabarti, Morgan Kaufmann, 2003). When a query shows up, relevant lists are retrieved and intersected to compute the answer. For example, search for all blog posts containing "global warming" posted in the first week of April 2007 from Toronto will require retrieval of 11 lists; 2 for the two tokens, and 7 lists one for each day (assuming a granularity of 1 day), and 2 lists corresponding to latitude and longitude of Toronto. Query result will be intersection of the two token lists with the latitude list, longitude list, and with union of the 7 lists corresponding to time.

It is easy to see that this approach is wasteful as it requires retrieval of long postings lists from disk. Assuming large amount of activity from Toronto, lists corresponding to latitude and longitude will be long (even though not all articles from Toronto talk about "global warming"). In a high-activity domain like the Blogosphere, the list for each of the days will also be very long (again, not all articles are from Toronto or talk about "global warming").

In one embodiment of the invention, even though the final query result set is small in size, long posting lists may be retrieved from disk; this provides an opportunity; as if the indices are designed intelligently, a lot of I/O can be saved resulting in considerable performance improvements.

In one embodiment of the invention the system may apply the following method to index time. Assume that each document has a unique document identification ("ID"). The document ID is incremented every time a new document is indexed. For indexing time information along with the documents the time never decreases. If the time of crawl is associated with each document, the time increases monotonically with document IDs. This implies that for each time temporal window (e.g., a 24 hour period), a range of document IDs can be maintained. For the query "global warming for the first week of April 2007", when intersecting the posting lists for tokens global and warming, only part of the lists is retrieved containing document IDs from the 7 days period specified in the query. Retrieval of part of postings list is possible since a range of document IDs is maintained for each time step (i.e., each day) and posting lists are sorted on document IDs. By maintaining a range of document IDs for each day, the retrieved size of postings list for tokens global and warming for the above query will be much smaller, hence resulting in significant performance gains.

In one embodiment of the present invention, due to crawling delays (and other practical issues), sometimes documents from previous dates may also be crawled. This means that the time-of-creation of a post may not be a strict monotonic function of document IDs. But the approach for indexing the time attribute as previously referenced can still be utilized because documents may be indexed in batch mode every night (and not as they arrive). During the batch indexing process, documents are first sorted based on their time data and then indexed. This way, for each time interval (e.g. a 24 hour period), a set of ranges of document IDs can be easily associated. When a query shows up, only documents belonging to one of these ranges need to be considered.

Therefore, by maintaining a list of ranges on document IDs with each time interval the time attribute present in the document may be queried in an efficient manner.

In one embodiment of the invention the system may apply the following method to maintain aligned bitmap posting lists. Consider the query for "global warming by male authors". If, along with each posting list for token, another aligned list is maintained containing the gender information; the query can be answered efficiently. Maintaining the gender information for a token's posting list of size n will require maintenance of another list with n entries with each entry being one of male or female. If the domain of the metadata attribute (gender in this example) is small, the additional list can be encoded as a bitmap (1 bit per entry for gender) for efficient storage. For the example query "global warming by male authors", the posting list for tokens "global" and "warming" are first retrieved. Next the two aligned lists for gender information for each of the two token posting lists are retrieved. The postings list for "global" and its associated list for gender information in "parallel" are read and a new temporary postings list is created for "global AND male". Next the same steps are undertaken to create a new temporary list for "warming AND male". Finally an intersection of the two temporary posting lists is taken to achieve for the final result, shown in FIG. 16. Observe that the process described below does not require any random I/O operations and all I/O is sequential which is both fast and efficient.

Aligned posting lists are beneficial when the domain size of the metadata attribute in consideration is small as use of bitmaps is feasible in that case. With each posting list, an additional list with equal number of entries is maintained which records the value of the metadata attribute. At the query time, the posting list for token is read in parallel with the associated metadata information list and a temporary posting list is constructed. All temporary posting lists are intersected for computing the final answer.

In one embodiment of the invention the system may apply the following method to partition token posting lists. Consider the query "zidane AND latitude=88.1". The first problem faced is that the postings list for "zidane" will be very long and will contain posts not belonging to "latitude=88.1". To circumvent this problem, the feature domain (latitude in this example) is divided into say 18 parts ([0-20], [20.1-40], . . . , [340.1, 360]). Instead of maintaining only one posting list for the token "zidane" instead 18 disjoint lists are maintained, one for each of the latitude partition. Observe that:

Now it is necessary to read only 1 of the 18 lists for "zidane" when the query "zidane AND latitude=88.1" arrives, reducing the disk I/O significantly.

If the query does not have a restriction on the latitude field, the query for "zidane" needs to read all 18 lists. This will not incur any significant additional cost since the union of these 18 lists is the same as the original list for "zidane".

There are multiple partitioning options available for dividing the feature domain. One may choose to use a simple equi-sized partitioning or a more sophisticated clustering algorithm. Since the number of partitions is a variable, a hierarchical clustering on the feature domain can be used to divide posting lists. A longer posting list needs to be divided in larger number of parts and a smaller list in fewer partitions. Depending on the length of the posting list, the appropriate level of partitioning in the hierarchy can be used.

In traditional blog search system architectures, for each feature f a hierarchical clustering on its domain Df is performed and the result is stored as hf. For each token t, based on the size of the posting list for t, a level in hf is selected and the posting list for t is partitioned accordingly. If the posting list is small, level zero in hf is selected, which means that the posting list for t is not partitioned at all. When the query arrives, the appropriate posting list is fetched based on the metadata restrictions for each token in the query, and posting lists for each of the metadata restrictions is fetched, at which point all of these are intersected.

In one embodiment of the invention the system may apply the following method to partition keyword posting lists. Consider the query "pixar AND rating=9.0" on IMDB looking for all Pixar movie reviews with rating 9.0. In this case, the posting list for feature "rating=9.0" will be long and will contain many non-Pixar movie reviews. The feature lists is partitioned by performing a keyword clustering as a preprocessing step. For example, it is possible to find 100 disjoint token clusters from the corpus. An example cluster could contain {pixar, toy, story, monsters, inc, finding, nemo, incredibles}. The intuition is that a text document will not contain tokens from more than a few cluster (the invention can perform an aggressive stop word and function word removal first). Each of the feature posting list is divided in 100 partitions based on the keyword clusters. When a query shows up, instead of fetching the complete feature posting list, the invention needs to fetch only a part of it. This may result in significant performance gains.

To summarize, this invention proposes several extensions to the well known inverted index methodology to support efficient querying over metadata attributes, such as time, age, gender, and location. One or more of these extensions can be used based on application requirements.

Spatial and Demographic Component

Another aspect of the invention is a spatial and demographic component. Along with each blog post, while crawling, the present invention attaches a city, state and country field and when possible geographical coordinates. There are several ways to infer a definite geographical coordinate given a blog post. These include:
- Utilizing metadata regarding location in the head of the blog. Several html tags and plug-ins exist to associate geographical information in blog posts. The present invention automatically identifies such tags by parsing them and attaches a geographical set of coordinates to the post.
- Utilizing information related to the address of the Blogger from its profile. The profile of a Blogger may contain address information. In that case the present invention extracts this information and maps it to a geographic set of coordinates. Approximate match information offered by tools like The Spider Project at the University of Toronto enables effective matching of addresses.
- Looking-up blog content against a set of standardized zip codes and city names also allows for extraction of geographic information from blog posts.

With the aid of such coordinates one has the option to identify the posts as a result of a query into a map and restrict the search using the map based on geography. This enables the present invention to conduct spatio-temporal navigation for blog posts and correlated keywords. The present invention maintains inverted lists for city, state, country for blog posts. When the search is restricted using a spatial restriction, such lists are manipulated to suitably restrict the scope of the search.

Demographic information regarding age, gender, industry, and profession of the individual may be inferred based on information disclosed on the profile page.

Popularity and Bursts

Another aspect of the invention is that it can track the Blogosphere popularity of keywords used in a query for a day by counting the number of posts relevant to the query for each day. This can be done efficiently by using the index structure as described previously in this document.

Prior art discusses burst detection in the context of text streams. The known approach is based on modeling the stream using an infinite state automaton. While interesting, this approach is computationally expensive, as it requires computing the minimum-cost state sequence requires solving a forward dynamic programming algorithm for hidden Markov models. It is therefore not possible to use this approach in our system where bursts need to be computed on the fly. Moreover, adapting the known technique for on the fly identification of bursts would be prohibitively expensive. Others have addressed the problem of burst event detection, and have proposed techniques to identify sets of burst features from a text stream (see: G. P. C. Fung, J. X. Yu, P. S. Yu, and H. Lu. Parameter free bursty events detection in text streams. In *Proceedings of the 31st International Conference on Very Large Data Bases*, Trondheim, Norway, pages 181-192, 2005).

In one embodiment of the invention, the following algorithm may be employed to detect bursts. This invention models the popularity x of a query as the sum of a base popularity $\mu$ and a zero mean Gaussian random variable with variance $\sigma^2$.

$$x \sim \mu + N(0, \sigma^2)$$

The exact popularity values $x_1, x_2, \ldots, x_w$ for the last w days is computed by using materialized statistics. The invention then estimates the value of $\mu$ and $\sigma$ from this data using the maximum likelihood.

$$\mu = \frac{1}{\omega} \sum_{i=1}^{\omega} x_i \text{ and } \sigma^2 = \frac{1}{\omega} \sum_{i=1}^{\omega} (x_i - \mu)^2$$

From the standard normal curve, the probability of the popularity for some day being greater than $\mu+2\sigma$ is less than 5%. The invention considers such cases as outliers and labels them as bursts. Therefore, the $i^{th}$ day will be identified as a burst if the popularity value for the $i^{th}$ day is greater than $\mu+2\sigma$. In our current implementation of the present invention the invention uses w=90 to compute $\mu$ and $\sigma$.

Keyword Correlations

Yet another aspect of the present invention is keyword correlation. The notion of correlation of two random variables is a well studied topic in statistics. Quantifying the correlation c(a,b) between two tokens a and b can have many different semantics. One semantics, for example, can be $$c(a, b) = \frac{P(a \in D \mid b \in D)}{P(a \in D)}$$
$$= \frac{P(b \in D \mid a \in D)}{P(b \in D)}$$
$$= \frac{P(a \in D \text{ and } b \in D)}{P(a \in D)P(b \in D)}$$

where P(t∈D) denotes the probability of token t appearing in some document D in the collection $\mathcal{D}$. In words, correlation between a and b is the amplification in probability of finding the token a in a document given that the document contains the token b. Calculation of correlations using such semantics requires checking each pair of tokens, which is clearly computationally highly expensive. With tokens in the order of millions, calculating c(a,b) using the above formula for every possible pair across several temporal granularities would amount to a large computational effort. This is complicated by the fact that such correlations have to be incrementally maintained as new data arrive. Increasing the number of keywords one wishes to maintain correlations for, from two to a higher number, gives rise to a problem of prohibitive complexity.

One embodiment of the invention may employ a fast technique to find correlations which is adopted by the present invention. Consider a query q and the collection of all documents $\mathcal{D}$. Let $\mathcal{D}_q \subseteq \mathcal{D}$ denote the set of documents containing all of query terms. For a token t the invention defines its score s(t,q) with respect to q as $$s(t,q) = |\{D | D \in \mathcal{D}_q \text{ and } t \in D\}| * idf(t) \qquad (1)$$

where idf(t) is the inverse document frequency of t in all documents $\mathcal{D}$.

$$idf(t) = \log\left(1 + \frac{|\mathcal{D}|}{|\{D | t \in D \text{ and } D \in \mathcal{D}\}|}\right)$$

The first term in Equation 1 is the frequency of the token t in documents relevant to the query q. The invention multiplies this frequency with idf(t) which represents the inverse of overall popularity of the token in the text corpus. Commonly occurring tokens like "and", "then", "when" have high overall popularity and therefore low idf. Hence the proposed scoring function favours tokens which have low overall popularity but high number of occurrences in documents relevant to the query q. This represents keywords that are closely related to q as they appear frequently only in documents containing q. The list of top-k tokens having highest score with respect to q forms a representative of $\mathcal{D}_q$. The invention displays this list as correlations for query q. This technique requires a single scan over $\mathcal{D}_q$. But even this could be prohibitively time consuming if the set $\mathcal{D}_q$ is large. To circumvent this problem the invention bounds the size of set $\mathcal{D}_q$ by a number m; if there are more than m documents containing query terms, the invention considers only the top-m documents most relevant to q.

This technique requires a single scan over top-m documents. The present invention uses m=30, thus, considering just 30 carefully ranked text articles to find correlated terms for a query. Assuming that the invention has assessed that keywords q,t above are correlated in a temporal window, repeating this process, using q and t as a query (expanding the query set) would yield keywords correlated with q and t (thus obtain a larger set of correlated keywords).

Authoritative Ranking

Another aspect of the present invention is an authoritative ranking. In one embodiment the present invention may compute the keyword synopsis set by employing a greedy expansion technique using the original query keyword(s) as a seed set. The invention enumerates keywords correlated to the searched query q, and then identifies burst intervals along the temporal dimension using the popularity curve of the correlated keyword in combination with q. The invention selects the pair with maximum burstiness and iteratively repeats the same process till increase in burstiness is insignificant. For example, given the seed query "cars" the burst on 9 Jun. 2006 (release date of the movie Cars) will be searched in conjunction with all its correlations "MERCEDES™", "truck" and "Pixar". Since "cars, Pixar" gives a burst of higher intensity than both "cars, Mercedes" and "cars, truck", Pixar will be selected to expand the set to {cars, Pixar}. In the second iteration, the invention considers queries of the form "cars, pixar, Disney", "cars, Pixar, nemo", Disney and nemo are both correlated to "cars, pixar") etc. of which the invention will select "Disney" (it contributes maximum to the burst) to expand our set to {cars, pixar, disney}.

The invention may continue with these iterations till the intensity of burst stops increasing. To find authoritative bursts the invention searches for blogs containing all words in the synopsis keyword set and selects those at the beginning of the bursts (earliest in time) having the highest number of incoming links.

Hot Keywords

Another aspect of the invention is hot keywords. Interestingness is naturally a subjective measure, as what is interesting varies according to the group of individuals it is intended for.

In one embodiment, given the difficulty and the subjective nature of the task, the present invention may adopt a statistical approach to the identification of hot keywords. The invention employs a mix of scoring functions to identify top keywords for a day. In order to produce a final list the invention aggregates (using weighted summation) scores from all different scoring functions to find a ranked list of hot keywords.

Let $x^t$ denote the popularity of some token t today, and $x_1^t$, $x_2^t, \ldots, x_w^t$ be the popularity of the token in the last w days (except today). Let $\mu^t$ and $\sigma^t$ be the mean and standard deviation respectively of these w numbers. The invention employs the following two scoring functions:

Burstiness measures the deviation of popularity from the mean value and is defined as $$\frac{x^t - \mu^t}{\sigma^t}$$

for a token t. A large deviation (burstiness) of a token implies that its current popularity is much larger than normal. The present invention, in this implementation, uses a value w=90 in this case. This value is set after conducting several experiments with the present invention.

Surprise measures the deviation of popularity from the expected value using a regression model. The invention conducts a regression of popularities for a keyword over the last w days to compute the expected popularity for today. Let $r(x^t)$ be this value. Then surprise is computed as $$\frac{|r(x^t) - x^t|}{\mu^t}.$$

This measure gives preference to tokens demonstrating surprising burst, ranking anticipated bursts low. Our implementation uses a value of w as 15 for this case. The choice of w in this case is set after experimentation with the present invention.

Using the burstiness and surprise measures the invention may compute an aggregate ranked list of interesting keywords for each day. To compute the aggregate list the invention adds scores from different scoring functions, but as an alternative, use of ranked list merging techniques as described in the next section is also possible. This way, the present invention may materialize a list of hot keywords for each day. The present invention allows users to query such lists using temporal conditions. For example, one may wish to identify hot keywords in the Blogosphere for a specific week. The present invention may employ algorithms to support such queries; they are detailed below.

Merging Ranked Lists

Another aspect of the invention is the merging of ranked lists. The present invention may support ad hoc temporal querying on hot keyword lists.

In one embodiment of the present invention, a list of hot keywords may produce regularly for 24 hour periods. This list can be materialized and sorted according to the aggregate burstiness and surprise scores of the keywords. Given a specified temporal interval, the present invention produces a hot keyword ranked list taking into account the ranked lists of hot keywords in the scope of the temporal interval.

Several approaches exist to merge ranked lists. The Kendall Tau distance measure and the Spearman footrule distance measures are commonly used metrics for comparing two lists. For merging ranked lists, the invention seeks a list that minimizes the sum of Kendall's Tau distance from all input lists. Such a measure has been shown to satisfy several fairness properties (e.g., Condorcet property). Unfortunately such computation is NP-Hard even for a small number of lists. As an approximation, the invention instead seeks the list that minimizes the sum of Spearman footrule distance from all input lists. This approximation is guaranteed to perform well as the aggregate footrule distance for any list is at most twice that of aggregate Kendall's Tau distance. The list minimizing aggregate footrule distance can be computed approximately by computing median ranks for each token in input list.

Let A be a universe of keywords and $\sigma_1 \ldots \sigma_n$ be ranked lists of keywords. A ranking $\sigma_i$ is full if the ranking is a permutation of A and partial otherwise. If the size of A is very large (e.g., number of keywords in the present invention is more than 10 million), it is impractical to assume availability of full rankings over A. The invention instead materializes in the present invention a top-m (m-highest ranking keywords) list for each day for suitably chosen m.

Fagin et al. (see: Fagin, Kumar, Mahdian, Sivakumar, and Vee. Comparing and aggregating rankings with ties. In *PODS: 23th ACM SIGACT-SIGMOD-SIGART Symposium on Principles of Database Systems*, 2004; R. Fagin, R. Kumar, and D. Sivakumar. Comparing top k lists. *SIJDM: SIAM Journal on Discrete Mathematics*, 17, 2003) have studied the problem of comparing top-k lists and partial ranking in detail. They consider each partial ranking (a top-k list can also be considered as a partial ranking) as a set of full rankings, and use Hausdorff metric with both Kendall's Tau and Footrule distance to compare them. Footrule distance can be used to approximate in the case of partial rankings also, because of the fact that Hausdorff metric with both Kendall's Tau and Footrule distance lie in the same equivalence class. The following proposition shows that Footrule optimal aggregation can be computed approximately using median ranks.

PROPOSITION 1. Let $\sigma_1 \ldots \sigma_n$ be partial rankings. Assume $\sigma$=median$(\sigma_1, \ldots, \sigma_n)$, and let $\sigma$ be a top-k list of f where ties are broken arbitrarily. Then for every top-k list $\tau$, $$\sum_{i=1}^{n} L_1(\sigma, \sigma_i) \le 3 \sum_{i=1}^{n} L_1(\tau, \sigma_i)$$

where $L_1$ is used to represent Footrule distance.

One embodiment of the present invention may approximate median computation through the following method. The present invention can maintain a list of hot keywords for each day for a total of n lists, were n is the total number of days the present invention has been materializing ranked lists. For each keyword $\rho \in A$ there are at most n ranks. Whenever a query requests an aggregate list during time $t \in [t_1, t_2]$, the invention is required to merge $t_2-t_1+1$ lists. One way to do this utilizing Proposition 1 is to first find the median rank for each keyword $\rho \in A$ and then to arrange the keywords in order of their median ranks. Thus, the invention may describe a simple solution for computing median ranks fast based on the algorithm discussed by Manku et al. (see: G. S. Manku, S. Rajagopalan, and B. G. Lindsay. Approximate medians and other quantiles in one pass and with limited memory. In *Proceedings of the ACM SIGMOD International Conference on Management of Data*, New York, 1998). For each keyword the invention can maintain an independent data structure and computes its median in isolation.

For each keyword $\rho \in A$ at any point in time, the present invention may materialize n ranks (for each day or a suitable lower level temporal granularity t=1 to n). The invention therefore can build a binary tree on these n numbers. Each node in this tree contains a bucket of size b. Leaf nodes are constructed by collapsing consecutive b numbers to one bucket. Each non-leaf node bucket is formed by collapsing buckets of its children. The algorithm for collapsing buckets is same as the one used by Manku et al. The tree has height $$\log_2 \frac{n}{b}.$$

Figure 7:
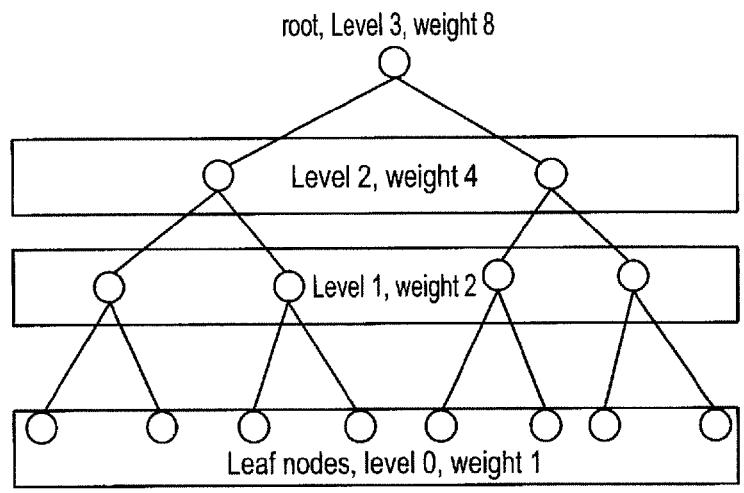
FIG. 7 illustrates a summary datastructure for a sequence with 8 nodes.

In this tree, the weight of a node at level l will be $2^l$, with leafs being at level zero. FIG. 7 shows an example tree.

When a query with a specified temporal interval $t \in [t_1, t_2]$ arrives (size s of the query is $t_2-t_1+1$), the invention first identifies the topmost nodes in the tree, which when selected will cover the time interval specified by the query. The number of such nodes will be bounded by $$2\log \frac{s}{b}.$$

Figure 8:
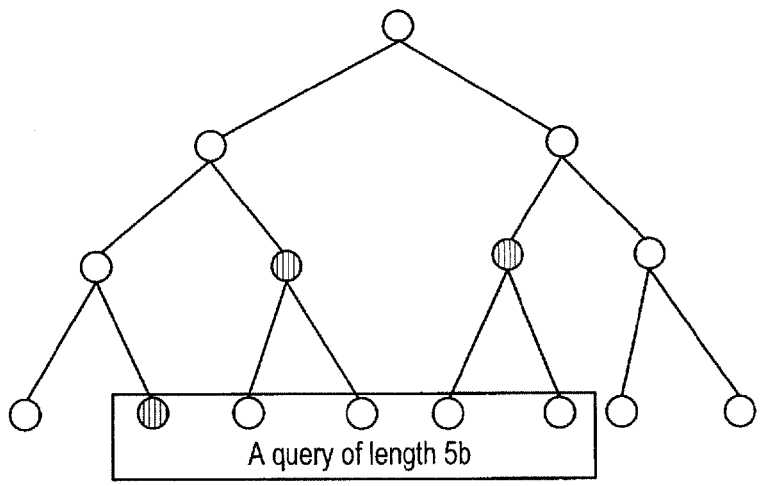
FIG. 8 illustrates answering a query of size 5 b using the stored summary.

The invention then uses the buckets at these nodes to produce and output the median. FIG. 8 shows an example query. First darker nodes are identified that cover all the queried nodes and then they are collapsed to produce the median.

PROPOSITION 2. The difference in rank between the true $\phi$-quantile of the original dataset and that of the output produced by the algorithm is at most $$\frac{W-C-1}{2} + w_{max}.$$

W is the total weight of all collapse operations, C is number of collapse operations, and $w_{max}$ is the weight of the heaviest bucket used to produce output.

The total weight of the collapse of all operations is not more than s log s/b. Also, $w_{max}$ is bounded by s. Using Proposition 2 and the fact that median is 0.5-quantile, the invention concludes that the difference between rank of true median and the one computed will be $$O\left(s\log\frac{s}{b}\right).$$

THEOREM. For a number sequence of length n, by maintaining extra n numbers, the invention can identify the median of a subsequence of length s in time $$O\left(b\log^2\frac{s}{b}\right)$$

with relative error $$O\left(\log\frac{s}{b}\right).$$

One embodiment of the present invention may undertake dynamic updates through the following method. This solution is amenable to highly dynamic updates as more lists are added to the present invention at each suitably chosen time step (say, each day). All that needs to be done is to adjust the tree structure by adding an extra leaf, subject to the bucket size b and dynamically adjust the higher levels of the tree, if required. Thus, the proposed solution for dynamically merging ranked lists of hot keywords in the present invention, renders itself to highly dynamic maintenance, as the information recorded in the system evolves in the temporal dimension.

One embodiment of the present invention can utilize the TA algorithm through the following method. Computing the median rank for each keyword and then sorting them can be very inefficient, especially when the size of the domain A is large. Hence the invention needs to use a threshold algorithm (TA) to prune off elements with high rank. the invention will deploy the above proposed solution, which acts like a black box to compute approximate median rank for any keyword ρ∈A for a time interval of length s (by maintaining an additional datastructure of size twice the original sequence), in conjunction with a TA style algorithm.

Figure 9:
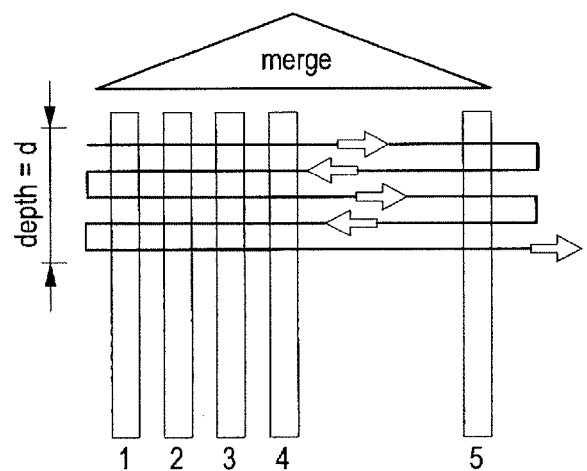
FIG. 9 illustrates merging s ranked lists to produce a top-k list.

The invention may have s ranked lists with the elements at top having rank 1. The invention can read elements one by one in a round-robin fashion as shown in FIG. 9. After reading a keyword ρ that is never seen before, invoke the median computation algorithm as described in the previous section to compute its median rank $r_\rho$. The invention may insert the pair (ρ, $r_\rho$) to a priority queue that maintains top-k keywords with minimum median rank.

After reading d elements from each of the list, it is certain that any unseen element can not have median rank less than d. This will serve as threshold condition. The invention can stop when the rank of last keyword in the priority queue containing top-k keywords is less than d.

Query by Document

Another aspect of the invention is a methodology for enabling the QBD feature. This feature allows the user to submit a text document as query. The system automatically constructs search queries as a collection of descriptive phrases. These phrases are subsequently used for querying the text source of interest.

In one embodiment of the present invention a problem statement may be utilized through the following method. A QBD query q consists of a query document d, and optionally, temporal or other metadata restrictions (e.g., age, profession, geographical location) specified by the user. The specific challenge the invention addresses is the extraction of a number k (user specified) of phrases from d in order to form a query with conjunctive semantics. Ideally the invention would like them to be the phrases that an average user would extract from d to retrieve blog posts related to the document.

Problem QBD Given a query document d, extract a user specified number k of phrases to be used as input query with conjunctive semantics to the present invention. The documents retrieved as result of search should be rated by an average user as related to the content of the query document.

All phrases extracted by QBD are present in the document. This functionality can be extended by taking into account external information sources. In particular Wikipedia contains a vast collection of information, in pages which exhibit high link connectivity. Consider the graph $G_w$ extracted from Wikipedia in which each node $v_i$ corresponds to the title of the i-th Wikipedia page and is adjacent to a set of nodes corresponding to the titles of all pages that the i-th page links to. The invention extracts such a graph, which is maintained up-to-date, currently consisting of 7M nodes. $G_w$ encompasses rich amount of information regarding phrases and the way they are related. For example starting with the node for 'Bill Clinton' the invention gets links to nodes for the 'President of the United States', 'Governor of Arkansas', and 'Hillary Rodham Clinton'. This graph evidently provides the ability to enhance or substitute our collection of phrases extracted by QBD with phrases not present in the query document. Given the numerous outlinks from the 'Bill Clinton' page, it is natural to reason regarding the most suitable set of title phrases to choose from Wikipedia. Let $\underline{v}_i$, $\underline{v}_j$ be two nodes in $G_w$ corresponding to two phrases in the result of QBD for a document. Intuitively the invention would like phrases in $G_w$ corresponding to nodes immediately adjacent to $\underline{v}_i$ and $\underline{v}_j$ to have higher chances to be selected as candidates for enhancing or substituting the result of QBD. This intuition is captured by an algorithm called RelevanceRank.

The choice to enhance or substitute the results of QBD on a document with Wikipedia phrases depends on the semantics of the resulting query. For example consider a document describing an event associated with "Bill Clinton", "Al Gore" and the "Kyoto Protocol" and that these three phrases are the result of QBD on a document. If the invention adds the phrase "Global Warming" extracted from Wikipedia (assuming that this phrase in not present in the result of QBD) the invention will be retrieving blog posts possibly associating "Global Warming" with the event described in the query document (if any). As an additional example consider a document concerning a new movie released by Pixar animation studios (say Ratatouille); assume that this document does not mention any other animated movies produced by Pixar. Nodes corresponding to other animated movies produced by "Pixar" would be good candidates from Wikipedia since they are pointed by both the node for "Pixar" and the node for "Ratatouille". By substituting (all or some) of the phrases in QBD by phrases extracted from Wikipedia, such as "Toy Story" and "Finding Nemo", the invention would be able to retrieve posts related to other movies produced by "Pixar". All the above intuitions are formalized in the following problem:

Problem QBD-W Given a set of phrases $C_{qbd}$ extracted by QBD containing k phrases from d, identify a number of phrases k' utilizing the result of QBD and the Wikipedia graph $G_w$. The resulting k' phrases will be used as input query with conjunctive semantics to the present invention. The documents retrieved as search results should be rated by an average user as related to the content of the query document.

In one embodiment of the present invention a phrase extraction QBD may be applied through the following methodology. The basic workflow behind our solutions to QBD is as follows:

Identify the set of all candidate key phrases $C_{all}$ for the query document d.

Assess the significance of each candidate phrase $c \in C_{all}$ assigning a score s(c) between 0 and 1.

Select the top-k (for a user specified value of k) phrases as $C_{qbd}$ as a solution to QBD.

10.2.1 Extracting Candidate Phrases

The invention may extract candidate phrases $C_{all}$ from the query document d with the help of a part-of-speech tagger (POST). Specifically, for each term w∈d, POST determines its part-of-speech (e.g., noun, verb, or adjective) by applying a pre-trained classifier on w and its surrounding terms in d. For instance, in sentence "Wii is the most popular gaming console", term "Wii" is classified as a noun, "popular" as an adjective, and so on. The tagged sentence is identified as "Wii/N is/V the/P most/A popular/J gaming/N console/N", where N, V, P, A, and J signify noun, verb, article, adverb, and adjective respectively.

Based on the part-of-speech tags, all noun phrases are considered as candidate phrases, and compute $C_{all}$ by extracting all such phrases from d. A noun phrase is a sequence of terms in d whose part-of-speech tags match a noun phrase pattern (NPP). Some example noun phrase patterns include "N", "NN", "JN", "JJN", "NNN", "JCJN", "JNNN", and "NNNN".

In one embodiment of the present invention scoring of candidate phrases may be applied through the following methodology. Once all candidate phrases are identified as $C_{all}$, a scoring function f is applied to each phrase $c \in C_{all}$. The scoring function assigns a score to c based on the properties of c, taking into account both the input document, and the background statistics about terms in c from the present invention corpus. The candidate phrases are revised in a pruning step to ensure that no redundant phrases are present. The invention can propose two scoring mechanisms, $f_t$ and $f_I$ for this purpose. $f_t$ utilizes the TF/IDF information of terms in c to assign a score, while $f_I$ computes the score based on the mutual information of the terms in phrase c. Both ranking mechanisms share the same pruning module to eliminate redundancy in the final result $C_{qbd}$.

In one embodiment of the present invention TD/IDF based scoring may be applied through the following methodology. The invention may include $f_t$, which is a linear combination of the total TF/IDF score of all terms in c and the degree of coherence of c. Coherence quantifies the likelihood these terms have in forming a single concept. Formally, let |c| be the number of terms in c; the invention uses, $w_1, w_2, \ldots, w_{|c|}$ to denote the actual terms. Let $idf(w_i)$ be the inverse document frequency of $w_i$ as computed over all posts in the present invention's corpus. $f_t$ is defined as $$f_t(c) = \sum_{i=1}^{|c|} tfidf(w_i) + \alpha \cdot coherence(c) \quad (4.1)$$

where α is a tunable parameter.

The first term $f_t$ in aggregates the importance of each term in c. A rare term that occurs frequently in d is more important than a common term frequently appearing in d (with low idf, e.g., here, when, or hello). This importance is nicely captured by tfidf for the term (See *Mining the Web: Discovering Knowledge from Hypertext Data*, by Soumen Chakrabarti, Morgan Kaufmann-2003 as reference for tf and idf). The invention uses the total, rather than average tfidf to favour phrases that are relatively long, and usually more descriptive.

The second term in $f_t$ captures how coherent the phrase c is. Let tf(c) e the number of times c appears in the document d, the coherence of c is defined as $$coherence(c) = \frac{tf(c) \times (1 + \log tf(c))}{\frac{1}{|c|} \times \sum_{i=1}^{|c|} tf(w_i)} \quad (4.2)$$

Intuitively, the above Equation compares the frequency of c (the numerator) against the average TF of its terms (the denominator). The additional logarithmic term strengthens the numerator, preferring phrases appearing frequently in the input document. For example, consider the text fragment " . . . at this moment Dow Jones . . . ". Since the phrase "moment Dow Jones" matches the pattern "NNN", it is included in $C_{all}$. However it is just a coincidence that the three nouns appear adjacent, and "moment Dow Jones" is not a commonly occurring phrase as such. The coherence of this phrase is therefore low (compared to the phrase "Dow Jones"), since the tf of the phrase is divided with the average tf of terms constituting it. This prohibits "moment Dow Jones" to appear high in the overall $f_t$ ranking.

Based on TF/IDF scoring, $f_t$ is good at distinguishing phrases that are characteristic of the input document. In the running example d="Wii is the most popular gaming console", $f_t$ strongly favours "Wii" over "gaming console" since the former is a much rarer term and thus has a much higher idf score. However, $f_t$ also has the drawback that it is often biased towards rare phrases.

In one embodiment of the present invention mutual information based scoring may be applied through the following methodology. $f_I$ uses mutual information (MI) between the terms of c as a measure of coherence in the phrase c along with idf values from the background corpus. Mutual information is widely used in information theory to measure the dependence of random variables. Specifically, the point wise mutual information of a pair of outcomes x and y belonging to discrete random variables X and Y is defined as (see: Church, K. W., Hanks, P. Word Association Norms, Mutual Information and Lexicography. In *ACL*, 1989.)

$$PMI(x, y) = \log\left(\frac{prob(x, y)}{prob(x)prob(y)}\right) \quad (4.3)$$

where prob(x), prob(y), prob(x,y) are the probability of x, y and the combination of the two respectively. The PMI of more than 2 variables is defined in a similar manner. Intuitively, for a phrase c consisting of terms $w_1, w_3, \ldots, w_{|c|}$, the higher the mutual information among the terms, the higher are the chances of the terms appearing frequently together; and thus they are more likely to be combined to form a phrase. In simple words, a set of terms with higher mutual information tends to co-occur frequently. PMI is not defined for a single variable, i.e., when the number of terms in c is one. In this case, the invention resorts to $f_t$ to score c.

The scoring function $f_l$ takes a linear combination of idf values of terms in c, frequency of c, and the point wise mutual information among them. Let tf(c) and tf($POS_c$) be the number of times c and its part-of-speech tag sequence $POS_c$ appear in d and $POS_d$ respectively, then $$f'_l = \sum_{i=1}^{|c|} idf(w_i) + \log \frac{tf(c)}{tf(POS_c)} + PMI(c) \quad (4.4)$$

The first part in the equation above represents how rare or descriptive each of the terms in c is. The second part denotes how frequent the phrase c is at the corresponding POS tag sequence in the document. The third part captures how likely are the terms to appear together in a phrase.

The PMI(c) for a phrase c is $$PMI(c) = \log \left( \frac{prob(c)}{\prod_{i=1}^{|c|} prob(w_i)} \right)$$

PMI can be evaluated either at the query document itself or at the background corpus. Computation of these probabilities for the background corpus requires a scan of all documents, which is prohibitively expensive. In order to compute PMI using d only, let prob($w_i$) and prob(c) denote the probability of occurrence of $w_i$ and c respectively at the appropriate part-of-speech tag sequence.

$$prob(c) = \frac{tf(c)}{tf(POS_c)}$$

$$prob(w_i) = \frac{tf(w_i)}{tf(POS_{w_i})}$$

Substituting these probabilities, $$f'_l(c) = \sum_{i=1}^{|c|} idf(w_i) + \log \frac{tf(c)}{tf(POS_c)} + \log \left( \frac{\frac{tf(c)}{tf(POS_c)}}{\prod_{i=1}^{|c|} \frac{tf(w_i)}{tf(POS_{w_i})}} \right) \quad (4.5)$$

The scoring function as defined in Equation 4.5 identifies how rare or descriptive each term is and how likely these terms are to form a phrase together. This definition however does not stress adequately the importance of how frequent the phrase is in document d; therefore the invention weighs it by $$\frac{tf(c)}{tf(POS_c)}$$

before computing the final score $f_l$. The scoring function $f_l$ therefore is, $$f_l(c) = \frac{tf(c)}{tf(POS_c)} \times \left( \sum_{i=1}^{|c|} idf(w_i) + \log \frac{tf(c)}{tf(POS_c)} + \log \left( \frac{\frac{tf(c)}{tf(POS_c)}}{\prod_{i=1}^{|c|} \frac{tf(w_i)}{tf(POS_{w_i})}} \right) \right)$$

The tf values in the above equations are computed by scanning the document d once, while the idf values are maintained precomputed for the corpus.

The scoring function ($f_t$ or $f_l$) evaluates each phrase c∈$C_{all}$ individually. As a result, candidate phrases may contain redundancy. For example, a ranking function may judge that both $c_1$="gaming console" and $c_2$="popular gaming console" as candidate phrases. Since $c_1$ and $c_2$ refer to the same entity, intuitively only one should appear in the final list $C_{qbd}$. The invention therefore applies a post-processing step after evaluating the ranking function on elements of $C_{all}$. Methodology for computing $C_{qbd}$ is shown in Algorithm below. Lines 7-14 demonstrate the pruning routine after evaluating the ranking function. Specifically, a phrase c is pruned when there exists another phrase c'∈$C_{qbd}$ such that (i) c' has a higher score than c, and (ii) c' is considered redundant in presence of c. The function Redundant evaluates whether one of the two phrases $c_1$, $c_2$ is unnecessary by comparing them literally.

Note that sometimes the shorter phrase may be more relevant, so the invention should not simply identify longer phrases. For instance, the phrase "drug" may have higher score than a longer phrase "tuberculosis drugs" in a document that talks about drugs in general, and tuberculosis drugs is one of the many different phrases where the term "drug" appears. Also, the candidate set $C_{all}$ may contain phrases with common suffix or prefix, e.g., "drug resistance", "drug facility" and "drug needs", in which case the invention keeps only the top few highest scoring phrases to eliminate redundancy. Redundant returns true if and only if either one phrase subsumes the other, or multiple elements in $C_{qbd}$ share common prefix/suffix.

| Algorithm 1 Algorithm for QBD |
|---|
| INPUT document d, and required number of phrases k |
| ComputeQBD |
| 1: Run a POS tagger to obtain the tag sequence $POS_d$ for d |
| 2: Initialize $C_{all}$ and $C_{qbd}$ to empty |
| 3: Match $POS_d$ against the PS Trie forest |
| 4: For each subsequent $POS_c$ ⊂ $POS_d$ that matches a NPP, append the corresponding term sequence to $C_{all}$ |
| 5: for each c ∈ $C_{all}$ do |
| 6:    Compute the score $s_c$ using either of $f_t$ or $f_l$ |
| 7:    if NOT exists c' ∈ $C_{qbd}$ such that (Redundant(c,c') = true and $s_{c'}$ > $s_c$) then |
| 8:        Add c to $C_{qbd}$ |
| 9:    end if |
| 10:   for each c' ∈ $C_{qbd}$ do |
| 11:      if Redundant(c,c') and $s_{c'}$ < $s_c$ then |
| 12:        Remove c' from $C_{qbd}$ |
| 13:      end if |
| 14:   end for |
| 15:   If |$C_{qbd}$| > k', remove the entry with minimum score |
| 16: end for |
| 17: OUTPUT $C_{qbd}$ |

In one embodiment of the present invention Wikipedia can be used in the QBD through the following methodology. The invention has constructed a directed graph $G_w$=<V,E> by preprocessing a snapshot of Wikipedia, modeling all pages with the vertex set V and the hyperlinks between them with the edge set E. Specifically, a phrase c is extracted for each page Pc in Wikipedia as the title of the page. Each such phrase is associated with a vertex in V. Hyperlinks between pages in Wikipedia translate to edges in the graph $G_w$. For example, the description page for "Wii" starts with the following sentence: "The Wii is the fifth home video game console released by Nintendo", which contains hyperlinks (underlined) to the description pages of "video game console" and "Nintendo" respectively. Intuitively, when the Wikipedia page Pc links to another page Pc', the underlying phrases c and c' are related. Consider two pages $Pc_1$ and $Pc_2$ both linking to Pc'. If the number of links from $Pc_1$ to Pc' is larger than the number of links from $Pc_2$ to Pc', the invention expects $c_1$ to have a stronger relationship with c'. This can be easily validated by observing the Wikipedia data.

Formally, the Wikipedia graph $G_w$ is constructed as follows: a vertex $v_c$ is created for each phrase c which is the title of the page Pc. A directed edge $e=<v_c,v_{c'}>$ is generated if there exists a hyperlink in Pc pointing to Pc'. A numerical weight $wt_e$ is assigned to the edge $e=<v_c,v_{c'}>$ with value equal to the number of hyperlinks from Pc pointing to Pc'. The invention refers to the weight of the edge between two vertices in graph $G_w$ as their affinity.

Figures 10A, 10B, 10C:
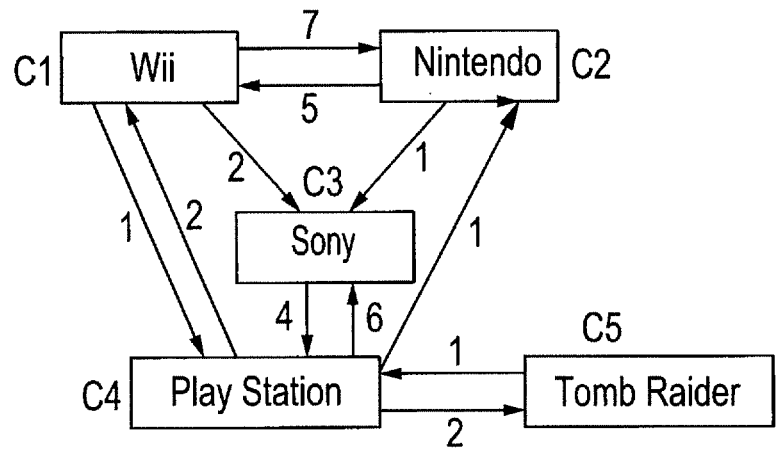
FIG. 10A illustrates and example graph extracted from Wikipedia.
FIG. 10B illustrates obtained transition matrix for the graph in FIG. 10A.
FIG. 10C illustrates resulting probabilities after running algorithm RelevanceRank on the graph of FIG. 10A after 1-5 iterations and at convergence.

Example 5.1 FIG. 10A depicts the interconnection between phrases $c_1$="Wii", $c_2$="Nintendo", $c_3$="Sony", $c_4$="Play Station", and $c_5$="Tomb Raider", in the Wikipedia graph. The number beside each edge signifies its weight, e.g., $wt<c_1,c_2>=7$ implying that there are 7 links from the description page of "Wii" to that of "Nintendo". Node $c_2$ is connected to both $c_1$ and $c_3$, signifying that "Nintendo" has affinity with both "Wii" and "Sony". Edge $<c_2,c_1>$ has a much higher weight than $<c_2,c_3>$, signifying that the affinity between "Nintendo" and "Wii" is stronger than that between "Nintendo" and "Sony" (the manufacturer of Play Station 3, a competitor of Wii). Therefore, if "Nintendo" is an important phrase mentioned in the input document d, i.e., $c_2 \in C_{qbd}$, it is much more likely that $c_1$ (rather than $c_3$) is closely relevant to d, and thus should be included in the enhanced phrase set after QBD-W.

Once $G_w$ is ready and the set $C_{qbd}$ is identified, it can be enhanced using the Wikipedia graph according to the following procedure:

Use $C_{qbd}$ to identify a seed set of phrases in the Wikipedia graph $G_w$.

Assign an initial score to all nodes in $G_w$.

Run the algorithm RelevanceRank as described in Algorithm displayed below to iteratively assign a relevance score to each node in $G_w$. The RelevanceRank algorithm is an iterative procedure in the same spirit as biased PageRank and TrustRank (see Gyongyi, Z., Garcia-Molina, H., Petersen, J. Combating Web Spam with TrustRank. In *VLDB*, 2004; Haveliwala, T. Topic-Sensitive PageRank. In *WWW*, 2002.).

Select the top-k' highest scoring nodes from $G_w$ (for user specified value of k') as top phrases $C_{wiki}$.

The RelevanceRank algorithm starts (Lines 1-5) by computing the seed set S containing the best matches of phrases in $C_{qbd}$. To find best matches, for each phrase $c \in C_{qbd}$, an exact string match over all nodes in $G_w$ is conducted to identify the node matching c exactly. If no such node exists an approximate match is conducted. The invention deploys edit distance based similarity for our experiments, but other approximate match techniques can also be used (see: Chandel, A., Hassanzadeh, O., Koudas, N., Sadoghi, M. Srivastava., D. Benchmarking Declarative Approximate Selection Predicates. In *SIGMOD*, 2007). It is possible that a phrase $c \in C_{qbd}$ is not described by any Wikipedia page. A threshold θ on maximum edit distance is therefore used. The matching phrase $c' \in G_w$ is added to the seed S only if the edit distance between c' and c is below θ.

---

Algorithm 2 Algorithm to compute RelevanceRank

INPUT Graph $G_w = <V,E>$, QBD phrases $C_{qbd}$, k'
RelevanceRank
1: Initialize the seed set to empty set
2: for each $c \in C_{qbd}$ do
3:    Compute node $v \in V$ with smallest edit distance to c
4:    If edit_distance(c,v) < θ, add v to S
5: end for
6: for each $v \in V$ do
7:    Assign initial score to v based on Equation 5.1
8: end for
9: for i = 1 to MaxIterations do
10:    Update scores for each $v \in V$ using Equation 5.3
11:    If convergence, i.e., $RR^i = RR^{i-1}$, break the for loop
12: end for
13: Construct $C_{wiki}$ as the set of top-k' vertices with highest RR scores

---

After generating S, RelevanceRank initializes the ranking score $RR_v^0$ of each vertex $v \in V$ (Lines 6-8). Let $c_v$ be the phrase in the seed set corresponding to the vertex v. Let $s(c_v)$ be the score assigned to it by one of the two scoring functions ($f_t$ or $f_f$) described in the previous section. $RR_v^0$ is defined by $$RR^D(v) = \begin{cases} \dfrac{s(c_v)}{\sum_{v' \in s} s(c_{v'})} & \text{if } v \in S \\ 0 & \text{otherwise} \end{cases} \quad (5.1)$$

This initializes the scores of all vertices not in the seed set to zero. Scores of vertices in the seed set the normalized to lie in [0, 1] such that the sum is 1.

Next RelevanceRank iterates (Lines 9-12) until convergence or reaching a maximum number of iterations MaxIterations. The $i^{th}$ iteration computes $RR^i$ based on the results of $RR^{i-1}$ following the spreading activation framework (see Crestani, F. Application of Spreading Activation Techniques in Information Retrieval. In *Artificial Intelligence Review*, 1997). Specifically, the transition matrix T is defined as $$T[v, v'] = \begin{cases} \dfrac{wt_e}{\sum_{e'=(v,w)} wt_{e'}} & \text{if } \exists e = <v, v'> \in E \\ 0 & \text{otherwise} \end{cases} \quad (5.2)$$

The entry T[v,v'] represents the fraction of out-links from the page corresponding to v in Wikipedia that point to the page associated with v'. Observe that each entry in T is in range [0,1] and the sum of all entries in a row is 1. Conceptually T captures the way a vertex v passes its affinity to its neighbours, so that when v is relevant, it is likely that a neighbouring phrase v' with high affinity to v is also relevant, though to a lesser degree.

Example The transition matrix for vertices in FIG. 10A is displayed in FIG. 10B.

To model the fact that a phrase connected to nodes from $C_{qbd}$ through many intermediate nodes is only remotely related, the propagation of RR is dampened as follows: with probability $\alpha_v$, v passes its RR score to its successors, and with probability $(1-\alpha_v)$ to one of the seed vertices S. Formally $RR_v^i$ in the i th iteration is computed by $$RR_v^i = \sum_{e=<v',v>} \alpha_{v'} \cdot RR_{v'}^{i-1} \cdot T[v', v] + RR_v^0 \sum_{v' \in V} (1 - \alpha_{v'}) RR_{v'}^{i-1} \quad (5.3)$$

The first term in the equation represents propagation of RR scores via incoming links to $\underline{v}$. The second term accounts for transfer of RR scores to seed nodes with probability $1-\underline{\alpha}_{v'}$. Recall that $RR_v^0$ is zero for phrases not in the seed set, and thus the second term in the equation above is zero for $v \notin S$.

The RelevanceRank algorithm can be alternatively explained in terms of the random surfer model. In the Wikipedia graph $G_w$, first the seed nodes are identified by using the result $C_{qbd}$ of QBD. Each of these seed nodes is assigned an initial score using a scoring function ($f_r$ or $f_j$). All other nodes are assigned score zero. The surfer starts from one of the seed nodes. When at node $\underline{v}$, the surfer decides to continue forward, selecting a neighbouring node v' with probability $\alpha_v \cdot T[v,v']$. With probability $1-\underline{\alpha}_v$, the surfer picks a node at random from the initial seed set. The probability of selection of the node from the seed set is proportional to the initial $RR^0$ scores of the nodes in S. At convergence, RR score of a node is the same as the probability of finding the random surfer there.

In RelevanceRank, with probability $1-\underline{\alpha}_v$, the random surfer jumps back to nodes in the seed set only and not to any node in $G_w$. This is in similar spirit as the topic-sensitive PageRank and TrustRank algorithms, which use a global constant value $\underline{\alpha}_v=\alpha$ for all $v \in G_w$ for returning back to one of the seed nodes. Selection of a constant $\alpha$ is however not suitable for RelevanceRank for the following two reasons:

The RelevanceRank scoring function must prefer nodes that are close to the initial seed set. In TrustRank, existence of a path between two nodes suffices for propagation of trust (as stationary state probabilities are probability values after the surfer makes infinitely many jumps). The same holds true for PageRank as well, where existence of a path is sufficient for propagation of authority. For the case of RelevanceRank however, the length of the path is an important consideration. Propagation of RR scores over long paths needs to be penalized. Only nodes in the vicinity of seed nodes are relevant to the query document. The value of $\underline{\alpha}_v$ therefore must depend on the distance of a node from the seed set.

$G_w$ consists of over 7 million nodes. Execution of the iterative algorithm to compute RR scores over the entire graph for every query is not feasible. Unlike TrustRank or PageRank, where one-time offline computation is sufficient, RelevanceRank needs to be evaluated on a per-query basis. Since only nodes close to the seed set are relevant, the invention sets $\underline{\alpha}_v$ to zero for vertices $v \in V$ far from the seed set S. Let $l_{max}$ be the maximum permissible length of path from a node to S. Define the graph distance GD(v) of a node $\underline{v}$ as its distance from the closest node in the seed set. Formally, $$GD(v) = \min_{v' \in S} \text{distance}(v', v)$$

where distance represents the length of the shortest path between two nodes. Thus, if $GD(v) \geq l_{max}$ for some $v \in V$, $\underline{\alpha}_v$ is assigned value 0. Application of this restriction on $\underline{\alpha}_v$ allows us to chop off all nodes from $G_w$ that are at distance greater than $l_{max}$ from S, which significantly reduces the size of the graph the invention needs to run the RelevanceRank algorithm on. As the value of $l_{max}$ increases, the size of sub-graph over which RelevanceRank is to be computed increases, leading to higher running times.

For the above mentioned reasons, $\underline{\alpha}_v$ for a node $\underline{v}$ is defined as a function of its graph distance GD(v). The invention would like $\underline{\alpha}_v$ to decrease as GD(v) increases such that $\underline{\alpha}_v=0$ if $GD(v) \geq l_{max}$. The invention defines $\underline{\alpha}_v$ as $$\alpha_v = \max\left(0, \alpha_{max} - \frac{GD(v)}{l_{max}}\right) \quad (5.4)$$

for some constant $\alpha_{max} \in [0, 1]$.

When the iterative algorithm for computation of RelevanceRank finishes, each node is assigned an RR score. The process is guaranteed to converge to a unique solution, as the algorithm is essentially the same as that of computing stationary state probabilities for an irreducible Markov chain with positive-recurrent states only (see: Feller, W. *An Introduction to Probability Theory and Its Applications*, Wiley, 1968). These nodes, and thus corresponding phrases, are sorted according to the RR scores, and top-k' (for a user-defined value of k') are selected as the enhanced phrase set $C_{wiki}$. The new set $C_{wiki}$ may contain additional phrases that are not present in $C_{qbd}$. Also, phrases from $C_{qbd}$ included in $C_{wiki}$ may have been re-ranked, that is the order of phrases in $C_{qbd}$ appearing in $C_{wiki}$ may be different than the corresponding order these phrases have in $C_{qbd}$. This means, even for $k' \leq k$, the set $C_{wiki}$ can be very different from $C_{qbd}$ depending on the information present in Wikipedia.

Example Consider the graph in FIG. 10A. Assume that the seed set consists of only one node "Nintendo". Let $\underline{\alpha}_{max}=0.8$ and $l_{max}=2$. Then, initial score for Nintendo will be 1, $RR_{Nintendo}^0=1$; and for Sony, Wii and Play Station, the initial score will be zero. Also, $\underline{\alpha}_{Nintendo}=0.8$, $\underline{\alpha}_{Sony}=0.3$, $\underline{\alpha}_{Wii}=0.3$, $\underline{\alpha}_{PlayStation}=0$, and $\underline{\alpha}_{TombRaider}=0$. Note that, the random surfer can never reach the node "Tomb Raider" in this setting since the surfer must jump back to "Nintendo" when he reaches the node "Play Station". Hence the invention can simply remove all nodes, including "Tomb Raider", with graph distance greater than 2 for calculating RR scores. The transition matrix is presented in FIG. 10B. Only the first four rows and columns of the transition matrix are relevant. RelevanceRank scores after few iterations will be as displayed in FIG. 10C. At convergence, "Nintendo" has the highest RR score 0.52, with "Wii" at the second position. Scores for "Sony" and "Play Station" are low as expected.

Example Consider the news article titled "U.S. Health Insurers Aim to Shape Reform Process" taken from Reuters (http://www.reuters.com/article/domesticNews/idUSN2024291720070720). Top 5 phrases in QBD for this article consists of "america's health care system", "ahip's ignani", "special interests", "tax credits," and "poorer Americans". While these phrases do relate to the meaning of the document, they do not necessarily constitute the best fit for describing it. The result of running QBD-W with the same value of k'=k=5 results in "american health care", "ahip", "universal health care", "united states" and "poore brothers". Arguably, the latter articulates the theme of the document in a much better way. Enhancement using wikipedia graph has replaced and re-ranked most items from the seed set consisting of 5 initial terms. For example, the phrase "AHIP's Ignani" that appears thrice in the document, and which refers to the CEO Karan Ignani of America's Health Insurance Plans, has been replaced with just AHIP. Also, "america's health care system" is re-written as "american health care" (due to use approximate string matching) which is the title of a page in Wikipedia.

BuzzGraph Computation

Another aspect of the present invention is the generation of graphs that are referenced as BuzzGraphs.

In one embodiment of the invention a query-specific BuzzGraph may be generated through the following methodology. For a given keyword query q with suitable demographic and temporal restrictions, all query results, results(q), are collected. For each result r in results(q), let ki and kj be two keywords. For each keyword ki, the invention maintains count(ki) across all results r in results(q) and count(ki,kj) across of r in results(q) representing the number of results keyword ki appears and number of results in which ki and kj both appear. The counts are existential namely if a keyword or keyword pair appear many times in a result r the invention only accounts for one occurrence. Given such counts, the invention assesses a correlation utilizing a log likelihood test (see *Foundations of Statistical Natural Language Processing* by Christopher D. Manning, Hinrich Schütze, MIT Press 2000). Let $pi = \text{count}(ki)/|\text{results}(q)|,$ $pj = \text{count})kj)/|\text{results}(q)|,$ and $p = (\text{count}(ki) + \text{count}(kj))/(2*|\text{results}(q)|).$ Denote as $L(pi, \text{count}(ki), |\text{results}(q)|) = \text{count}(ki)*\log(pi) + (|\text{results}(q)| - \text{count}(ki))*\log(1 - pi).$ Then the log likelihood test is denoted as $2*(L(pi, \text{count}(ki), |\text{results}(q)|) + L(pj, \text{count}(kj), |\text{results}(q)|) - L(p, |\text{results}(q)| - \text{count}(ki), |\text{results}(q)|) - L(p, |\text{results}(q)| - \text{count}(kj), |\text{results}(q)|))$. This measure has asymptotically the same properties as the statistical chi-squared test but is more appropriate for the small counts that are expected for keywords given that the invention inspects a small number of answers at the result of a query q. This test is thresholded with suitable values to assess correlation as a specified statistical significance level utilizing statistical tables. All pairs that survive this thresholding are correlated. The invention limits their number by selecting only a number specified by a user that consists of the most important correlated pairs. Importance is computed by aggregating the tfidf score of the keywords in the pair.

In another embodiment of the invention, the second type of BuzzGraph may be constructed on the information of the entire collection of documents collected by the system on an arbitrarily specified temporal period (suitably restricted by demographic information if required). In this case in analogy with the query specific BuzzGraph, let results refer to the entire collection of document for the specified time interval belonging to the specified demographic group. The invention may accumulate counts for each keyword and each keyword pair as before. The invention may then construct a graph with vertices corresponding to each keyword encountered in results. An edge between two keywords is annotated with the count of the number of times the keywords co-occur in results. Counts have existential semantics as before. For each pair of keywords the invention conducts a chi-squared test utilizing count(ki,kj), count(ki) and count(kj) as well as |results|, the number of results which is the total number of documents collected in the suitable time period. This test is thresholded to gain statistical significance at the suitable level. In addition for each pair surviving the threshold test, the invention computes the linear correlation coefficient between the two keywords, utilizing the counts. This coefficient is computed as $r(ki,kj) = (|\text{results}|\text{count}(ki,kj) - \text{count}(ki)\text{count}(kj))/(\text{sqrt}((|\text{results}| - \text{count}(ki))\text{count}(kj)) * \text{sqrt}(|\text{results}| - \text{count}(kj))\text{count}(ki))).$ A pair of keywords is maintained only of the linear correlation coefficient between the pair is above a user specified threshold. All keyword pairs that survive the tests form the BuzzGraph for the general case.

In yet another embodiment of the invention both forms of BuzzGraph may be generated.

It will be appreciated by those skilled in the art that other variations of the embodiments described herein may also be practised without departing from the scope of the invention. The within disclosure discusses certain analysis methods, functionalities, systems architecture components and other utilities as a means for illustrating the operation and implementation of the present invention. It should be understood that the present invention is not limited to particular software, system, or network architectures or configurations, or to specific allocations of resources or functionality as between particular system components, software components, or other utilities. It should be understood that one or more system components, software components, or other utilities, could be provided as a greater or lesser number of system components, software components, or other utilities. The functionality described can be provided based on numerous architectures for delivering functionality, including but not limited to a client-server architecture, web service architecture (with or without resident software components), and standalone computer systems. While add-on utilities have not been discussed, it would be obvious to a person skilled in the art that various add-on utilities can be included into or linked to the query search method or system architecture for example to further streamline query search results. The present invention invokes user intervention in certain cases. The way in which user intervention is involved and processed, and the tools used for user intervention, can be modified without departing from the scope of the invention. For example, additional tools for enabling user directed searches are contemplated. The present invention is not limited to any particular software structure, including a modular structure. Furthermore, the present invention could be implemented on a variety of hardware structures including digital signal processors.

For example, in one embodiment, a method for searching one or more text sources that include temporally-ordered data objects includes the following steps: providing access to one or more text sources, each text source including one or more temporally-ordered data objects; obtaining or generating a search query based on one or more terms and one or more time intervals; obtaining or generating time data associated with the data objects; identifying one or more data objects based on the search query; and generating one or more popularity curves based on the frequency of data objects corresponding to one or more of the search terms in the one or more time intervals.

Optionally, the method may include the further steps of analysing data objects within the one or more popularity curves; and defining one or more data objects as data objects of interest based on fluctuations in the popularity curve indicating a high frequency of data objects corresponding to one or more search terms. As a further feature of this option, the method may include the further step of generating one or more additional terms associated with the data objects of interest.

As another option, the method may include the further steps of generating and submitting a search query automatically based upon one or more specific data objects, or one or more obtained terms, and one or more terms generated by a prior search query. As a further feature of this option, the step of generating the search query based upon one or more specific data objects further includes extracting query terms from the one or more specified data objects by way of an algorithmic methodology.

As yet another option, the method may include the step of ranking the data objects and additional terms associated with data objects of interest. As a further feature of this option, the ranking orders the data objects and additional terms associated with the data objects of interest in accordance with the authoritative nature of the data object as indicated by the data associated with the data object establishing that a data object is frequently referenced by users.

As another option, the method further includes the step of including in the search query one or more of: one or more geographical search terms, or one or more demographic search terms.

As yet another option, the one or more popularity curves generated according to the method are based upon sentiment analysis derived through assigning user sentiment data to each data object, either positive or negative, by defining or obtaining positive or negative terms relating to the data objects, inferring the sentiment data from the presence or absence of such positive or negative terms, and based on such sentiment data defining additional information for a search query. As another feature, fluctuations in the popularity curve are drill-down and roll-up capable.

According to another embodiment, a system for searching a text source that includes temporally-ordered data objects includes a computer, a search term definition utility linked to the computer or loaded on the computer; wherein the computer is connected via an inter-connected network of computers to one or more text sources including temporally-ordered data objects; wherein the system, by means of cooperation of the search term definition utility and the computer, is operable to: provide access to one or more text sources, each text source including one or more temporally-ordered data objects; obtain or generate a search query based on one or more terms and one or more time intervals; obtain or generate time data associated with the data objects; identify one or more data objects based on the search query; and generate one or more popularity curves based on the frequency of data objects corresponding to one or more of the search terms in the one or more time intervals.

Optionally, the system is operable to: analyse data objects within the one or more popularity curves; and define one or more data objects as data objects of interest based on fluctuations in the one or more popularity curves indicating a high frequency of data objects corresponding to one or more search terms. As a further feature, the system is further operable to generate one or more additional terms associated with the data objects of interest.

The system may optionally include a means for generating and submitting a search query automatically based upon one or more specific data objects; one or more obtained terms; or one or more terms generated by a prior search query.

Optionally, the system is operable to generate a search query based upon an algorithmic methodology for the extraction of query terms from the one or more specified data objects.

As another option, the search term definition utility of the system incorporates or is linked to a means for ranking of the data objects and of additional terms associated with data objects of interest. As an additional feature, the ranking of data objects and of additional terms associated with data objects of interest is achieved by the search term definition utility being operable to obtain data associated with the data object establishing that the data object is frequently referenced by users and to utilize such data for the purpose of providing an authoritative ranking based on the authoritative nature of the data object as indicated by the data.

As yet another option, the search query includes one or more of: one or more geographical search terms, or one or more demographic search terms.

As yet another option, one or more popularity curves are generated based upon sentiment analysis derived through the search term definition utility that includes a means of assigning user sentiment data to each data object, either positive or negative, and by defining or obtaining positive or negative terms relating to the data objects the search term definition utility infers the sentiment data from the presence or absence of such positive or negative terms, and based on such sentiment data defines additional information for a search query.

Optionally, the search term definition utility of the system includes or is linked to a means of rendering the popularity curve drill-down and roll-up capable.

As another option, the computer is linked to a database and the search term definition utility is operable to populate said database with data based upon the search query and the database is operable to: index data; generate statistics; and facilitate rich queries.

As yet another option, the computer is linked to a display whereby the system is operable to display information generated by the search query or data stored in the database. As a further feature, the system is operable to display one or more of: a graph, ranked terms, additional terms associated with the data objects, a tooltip, or a popularity curve. As another feature, the system is operable to display a graph based upon one or more additional terms associated with the data objects whereby said additional terms are plotted graphically to indicate one or more of: correlations between the additional terms, or sentiment analysis.

As yet another option, the search term definition utility of the system is a crawler operable to fetch and parse a data feed automatically at a regular time interval and wherein the additional terms associated with the data objects are utilized to generate search query terms.

According to yet another embodiment, a computer program product includes a computer-readable medium, the medium having stored thereon computer instructions made available to a computer that are operable to define a search term definition utility, wherein the computer is linked to one or more text sources including temporally-ordered data objects, wherein the computer program product, by means of cooperation of the search term definition utility and the computer is characterized in that the search term definition utility is operable to: provide access to one or more text sources, each text source including one or more temporally-ordered data objects, obtain or generate one or more time intervals; obtain or generate a search query based on one or more terms and one or more time intervals; identify one or more data objects based on the search query; and generate one or more popularity curves based on the frequency of data objects corresponding to one or more of the search terms in the one or more time intervals.

As an option, the computer program product is further operable to rank the data objects and additional terms associated with data objects in one or more of: an authoritative ranking based upon data associated with the data object establishing that the data object is frequently referenced by users obtained by the search term definition utility to establish the authoritative nature of the data object as indicated by the data, or time data associated with the data object.

As another option, the computer instructions are further operable to run automatically in accordance with a specified time interval.

As yet another option, the computer instructions are further operable to automatically generate a search query based upon one or more specific data objects through the application of an algorithmic methodology whereby terms are extracted from the one or more data objects.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. A method for searching one or more text sources including temporally-ordered data objects, the method comprising the steps of:
   providing access to the one or more text sources, each text source including one or more temporally-ordered data objects;
   obtaining or generating a search query based on one or more search tokens and one or more time intervals;
   obtaining or generating time data associated with the temporally-ordered data objects included in the one or more text sources;
   identifying one or more data objects related to the search query in the one or more text sources;
   generating one or more popularity curves based on frequency of the identified data objects corresponding to one or more of the search tokens in the one or more time intervals and the time data, the popularity curve exhibiting fluctuations of popularity over the one or more time intervals;
   identifying a burst in the one or more popularity curves, the burst occurring in one or more burst time intervals;
   identifying data objects related to the search query in the one or more burst time intervals as burst data objects;
   for each of the burst data objects, assigning an authoritative index to the each burst data objects, the authoritative index being computed from a frequency of content related to the search query contributed by an author of the each burst data object;
   ranking the burst data objects according to the authoritative index to obtain the top-i ranked burst data objects, i being an integer; and
   providing the top-i ranked burst data objects as authoritative data objects for user selection and viewing;
   wherein each data object comprises at least one of a blog, document, posting, article, email and message.

2. The method of claim 1, the method further comprising the steps of:
   receiving a request from a user of searching with a drill-down parameter, the drill-down parameter being selected from: a drilled-down time interval within any one of the one or more time intervals, a geographic location associated with at least one of the identified data objects, an identifiable origin of the one or more text sources, or any combination thereof;
   restricting the search query to the drill-down parameter to obtain a restricted search query;
   identifying one or more drilled-down data objects related to the restricted search query;
   obtaining or generating drilled-down time data associated with the one or more drilled-down data objects; and
   generating one or more drilled-down popularity curves based on frequency of the drilled-down data objects and the drilled-down time data.

3. The method of claim 1, the method further comprising the steps of:
   generating one or more additional search tokens associated with the one or more data objects, the one or more additional search tokens having a low popularity value and a high number of occurrences in the one or more data objects.

4. The method of claim 1, wherein the search query includes one or more of: one or more geographical search tokens, one or more demographic search tokens.

5. The method of claim 1, the method further comprising the steps of:
   assigning user sentiment data extracted from each of the identified data objects to the each data objects, optionally the sentiment data being one of positive, neutral or negative,
   segregating the popularity curves into regions generated from the identified data objects based on assigned sentiment data.

6. The method of claim 5, wherein the regions include a positive region generated from data objects associated with positive sentiment data, a neutral region generated from data objects associated with neutral sentiment data and a negative region generated from data objects associated with negative sentiment data.

7. The method of claim 1 further comprising determining at least one of the search tokens to be of interest if the at least one of the search tokens has a deviation of popularity above an expected value of popularity of a given day, the expected value of popularity computed based on popularity values from a predetermined number of days before the given day.

8. The method of claim 7, wherein the expected value of popularity is computed by a regression of the popularity values from the predetermined number of days before the given day.

9. The method of claim 1, wherein the authoritative index is further computed from a readability index assigned to the each burst data object.

10. The method of claim 1, wherein the authoritative index is further computed from at least one of: geographic information of the author, and demographic information of the author.

11. A system for searching one or more text sources including temporally-ordered data objects, the system comprising:
    a computer connected to the one or more text sources; and
    a search term definition utility linked to the computer or executing on the computer;
    the computer and the search term definition utility being configured to cooperate with each other and being operable to:
       provide access to the one or more text sources, each text source including one or more temporally-ordered data objects;
       obtain or generate a search query based on one or more search tokens and one or more time intervals;
       obtain or generate time data associated with the temporally-ordered data objects included in the one or more text sources;
       identify one or more data objects related to the search query in the one or more text sources;
       generate one or more popularity curves based on the frequency of the identified data objects corresponding to one or more of the search tokens in the one or more time intervals and the time data;
identify a burst in the one or more popularity curves, the burst occurring in one or more burst time intervals;
identify data objects related to the search query in the one or more burst time intervals as burst data objects;
for each of the burst data objects, assign an authoritative index to the each burst data objects, the authoritative index being computed from a frequency of content related to the search query contributed by an author of the each burst data object;
rank the burst data objects according to the authoritative index to obtain the top-i ranked burst data objects, i being an integer; and
provide the top-i ranked burst data objects as authoritative data objects for user selection and viewing;
wherein each data object comprises at least one of a blog, document, posting, article, email and message.

12. The system of claim 11, further comprising:
a graphical user interface operably connected to the computer and the search term definition utility, the graphical user interface receiving a request from a user of searching with a drill-down parameter, the drill-down parameter being selected from: a drilled-down time interval within any one of the one or more time intervals, a geographic location associated with at least one of the identified data objects, an identifiable origin of the one or more text sources, or any combination thereof,
wherein the computer and the search term definition utility are further configured and operable to:
restrict the search query to the drill-down parameter to obtain a restricted search query;
identify one or more drilled-down data objects related to the restricted search query;
obtain or generate drilled-down time data associated with the one or more drilled-down data objects; and
generate one or more drilled-down popularity curves based on frequency of the drilled-down data objects and the drilled-down time data.

13. A computer software product for use on a computer system, the computer software product comprising:
a computer readable non-transitory storage medium,
computer program code means stored on the computer readable non-transitory storage medium, the computer program code means comprising encoded instructions, wherein the encoded instructions comprise:
providing access to the one or more text sources, each text source including one or more temporally-ordered data objects;
obtaining or generating a search query based on one or more search tokens and one or more time intervals;
obtaining or generating time data associated with the temporally-ordered data objects included in the one or more text sources;
identifying one or more data objects related to the search query in the one or more text sources;
generating one or more popularity curves based on frequency of the identified data objects corresponding to one or more of the search tokens in the one or more time intervals and the time data, the popularity curve exhibiting fluctuations of popularity over the one or more time intervals;
identifying a burst in the one or more popularity curves, the burst occurring in one or more burst time intervals;
identifying data objects related to the search query in the one or more burst time intervals as burst data objects;
for each of the burst data objects, assigning an authoritative index to the each burst data objects, the authoritative index being computed from a frequency of content related to the search query contributed by an author of the each burst data object;
ranking the burst data objects according to the authoritative index to obtain the top-i ranked burst data objects, i being an integer; and
providing the top-i ranked burst data objects as authoritative data objects for user selection and viewing;
wherein each data object comprises at least one of a blog, document, posting, article, email and message.

14. The computer software product of claim 13 wherein the encoded instructions further comprise:
receiving a request from a user of searching with a drill-down parameter, the drill-down parameter being selected from: a drilled-down time interval within any one of the one or more time intervals, a geographic location associated with at least one of the identified data objects, an identifiable origin of the one or more text sources, or any combination thereof;
restricting the search query to the drill-down parameter to obtain a restricted search query;
identifying one or more drilled-down data objects related to the restricted search query;
obtaining or generating drilled-down time data associated with the one or more drilled-down data objects; and
generating one or more drilled-down popularity curves based on frequency of the drilled-down data objects and the drilled-down time data.

15. The computer software product of claim 13 wherein the encoded instructions further comprise generating one or more additional search tokens associated with the one or more data objects, the one or more additional search tokens having a low popularity value and a high number of occurrences in the one or more data objects.

16. The computer software product of claim 13 wherein the search query includes one or more of: one or more geographical search tokens, one or more demographic search tokens.

17. The computer software product of claim 13 wherein the encoded instructions further comprise:
assigning user sentiment data extracted from each of the identified data objects to the each data objects, optionally the sentiment data being one of positive, neutral or negative; and
segregating the popularity curves into regions generated from the identified data objects based on assigned sentiment data.

18. The computer software product of claim 17 wherein the regions include a positive region generated from data objects associated with positive sentiment data, a neutral region generated from data objects associated with neutral sentiment data and a negative region generated from data objects associated with negative sentiment data.

19. The computer software product of claim 13, wherein the encoded instructions further comprise determining at least one of the search tokens to be of interest if the at least one of the search tokens has a deviation of popularity above an expected value of popularity of a given day, the expected value of popularity computed based on popularity values from a predetermined number of days before the given day.

20. The computer software product of claim 19 wherein the expected value of popularity is computed by a regression of popularity values from the predetermined number of days before the given day.

21. The computer software product of claim 13, wherein the authoritative index is further computed from a readability index assigned to the each burst data object.

22. The computer software product of claim 13, wherein the authoritative index is further computed from at least one of: geographic information of the author, and demographic information of the author.

* * * * *